Aug. 26, 1958　　　W. W. HANNON　　　2,849,677
ELECTRICAL CIRCUIT ANALYZER
Filed Dec. 1, 1954　　　　　　　　　　　　　　6 Sheets-Sheet 1
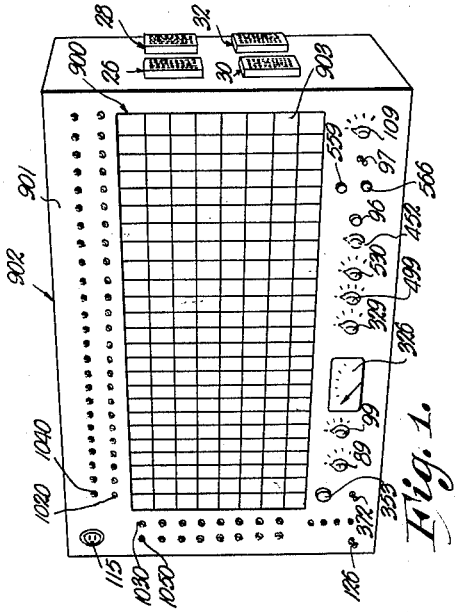
Fig. 1.
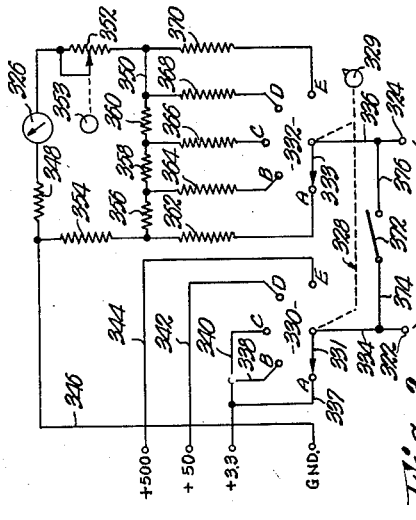
Fig. 3.
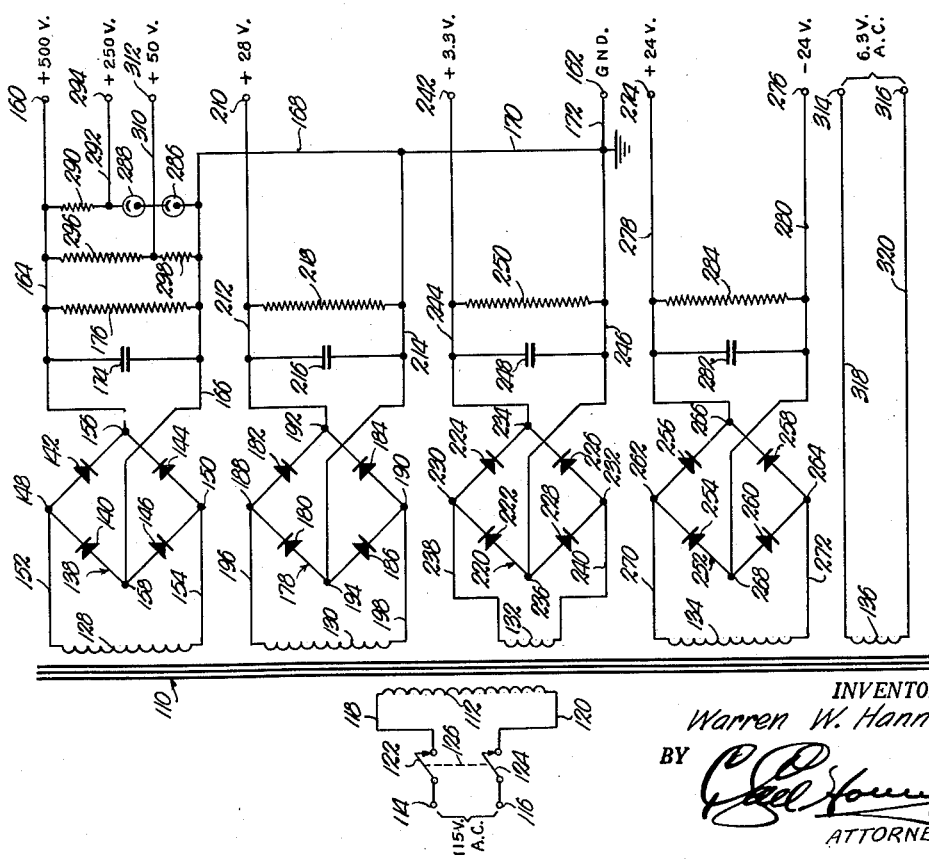
Fig. 2.
INVENTOR.
Warren W. Hannon
BY
ATTORNEY.

INVENTOR.
Warren W. Hannon

Aug. 26, 1958 W. W. HANNON 2,849,677
ELECTRICAL CIRCUIT ANALYZER
Filed Dec. 1, 1954 6 Sheets-Sheet 5
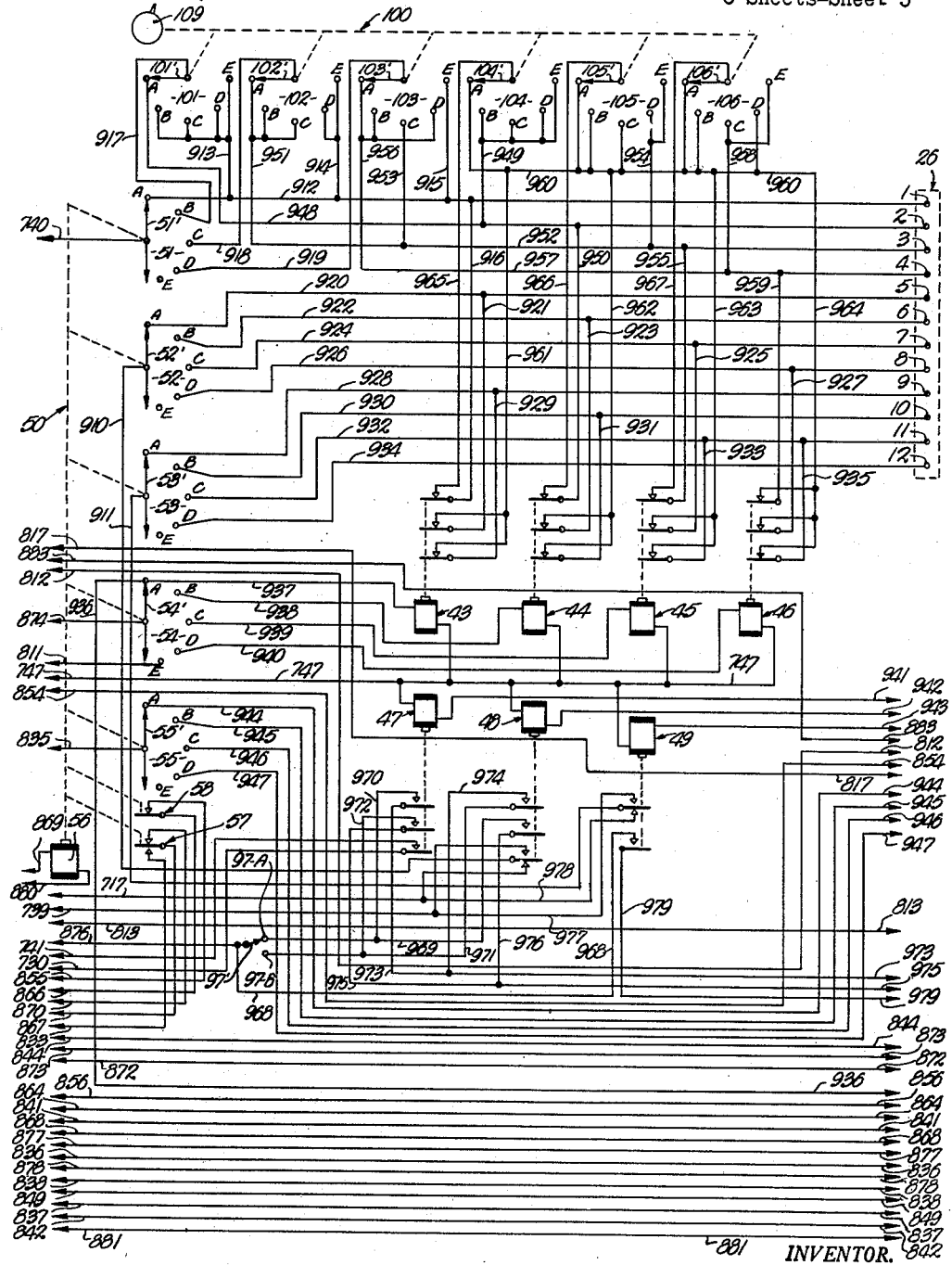
Fig. 4D.
INVENTOR.
Warren W. Hannon
BY 
ATTORNEY.

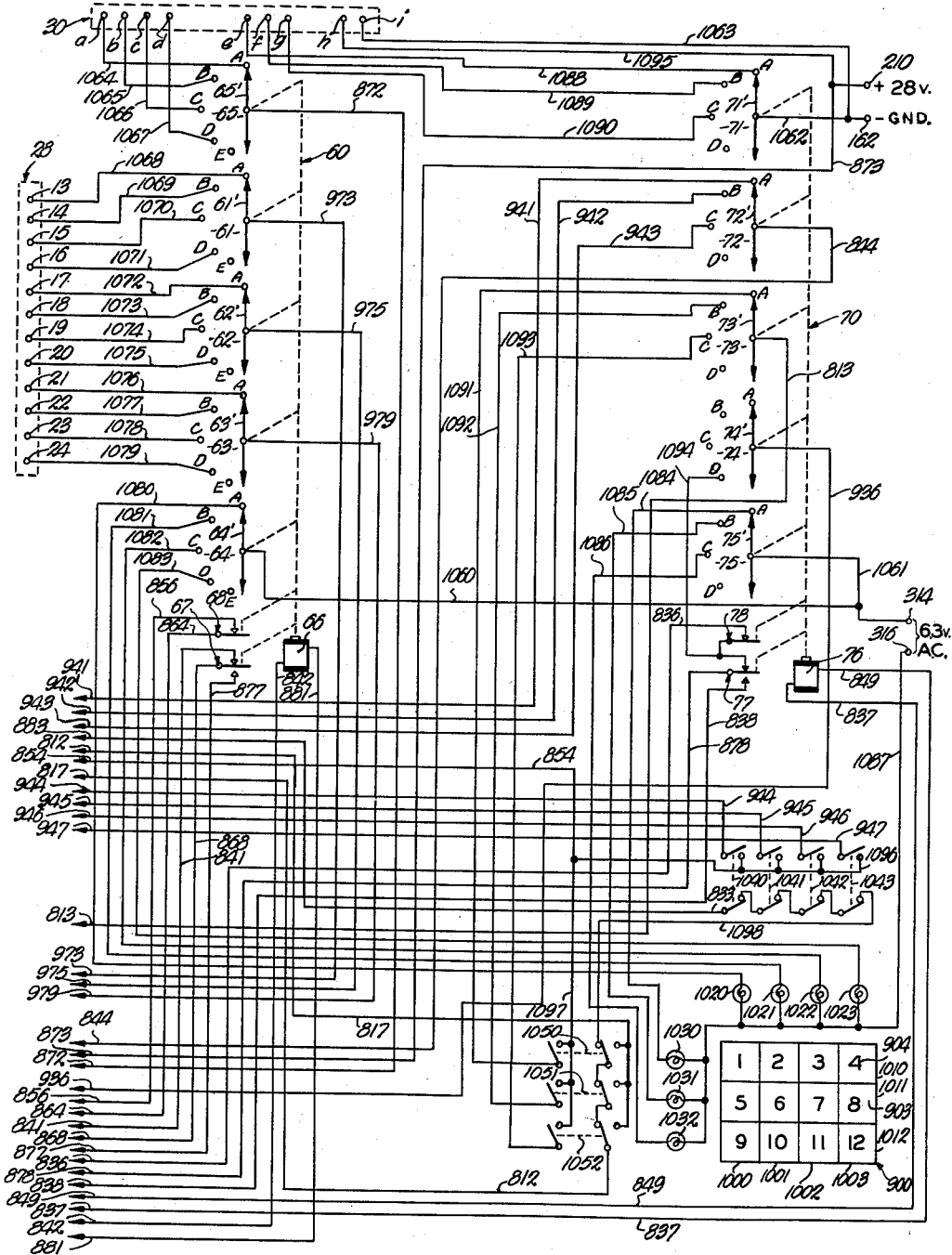
Fig. 4-E.

United States Patent Office 2,849,677
Patented Aug. 26, 1958

2,849,677

ELECTRICAL CIRCUIT ANALYZER

Warren W. Hannon, Olathe, Kans., assignor to Dit-MCO, Inc., Kansas City, Mo., a corporation of Missouri Application December 1, 1954, Serial No. 472,487

13 Claims. (Cl. 324—73)

This invention relates to the field of electrical testing equipment and, more particularly, to an automatic fault detecting instrument for use in checking electrical circutry for continuity, shorts, insulation resistance, functioning of components and the like.

Circuit testers heretofore known have all been deficient in one or more respects rendering the same either impractical for general commercial use or of a nature offering only negligible advantage over manual point-to-point testing with test probes or the like. Typical of such earlier attempts to solve the problem are the arrangements which have involved essentially only the provision of means for manually switching a test instrument or indicator from one circuit to be checked to another, the arrangements which are adapted for checking only one particular set of circuits for which the testing arrangement is specifically designed, and the arrangements which have provided essentially a separate test instrument or indicator for each of a plurality of circuits to be checked. Insofar as is known, there has been no previous provision for automatically and in rapid succession checking a plurality of circuits with such operation normally being interrupted only in the event of detection of a fault. Nor has any known prior apparatus heretofore made provision for the testing of so-called multiple circuits having interconnections therebetween which, with conventional circuit testing apparatus, would falsely indicate a fault where none in fact exists. Nor has there heretofore been available circuit analyzing equipment capable of making simultaneous checks for continuity and shorts, including means for making continuity tests in terms of a predetermined tolerance value for line resistance and for making short tests in terms of a predetermined tolerance value for insulation resistance, together with means for giving exact indications of line resistance or insulation resistance, where desired, as in the event of a fault whose nature is to be fully determined.

It is the primary purpose of this invention to overcome all of the above-mentioned and many other shortcomings and disadvantages of previously known circuit testing equipment and to present truly reliable, versatile and practical automatic, circuit analyzing apparatus adapted for use in checking the wiring and functioning of various types of electrical systems and circuitry, including those involving multiple or intercoupled circuits which are interconnected in various ways such as by relays or switches, a common terminal, etc.

It is another important object of this invention to provide such a circuit analyzer having means for use in adapting the analyzer for coupling with any of various pluralities of circuits to be tested, means for automatically and successively switching one circuit after another into connection with testing or fault detecting means adapted to simultaneously detect shorts or excess insulation leakage and lack of continuity or excess line resistance, means for indicating the particular one of said plurality of circuits being tested at any instant, means for automatically indicating the detection of a fault and for staying the switching at the faulty circuit until its identity can be noted, and means for measuring the exact electrical characteristics of a circuit under test to more precisely indicate the nature of a fault detected therein.

Other important objects of this invention will be made clear or become apparent as the following specification progresses. It is particularly noted that some of the most important features of the analyzer contemplated will be best understood from the explanation of its operation hereinafter. In the accompanying drawings:

Figure 1 is a perspective view of one form of external cabinet for an analyzer made in accordance with this invention having a capacity for testing a system of 200 circuits and showing the circuit identification matrix chart, the various operating controls and indicating devices, and the sockets for receiving adaptor cables used to connect the anlyzer with the electrical system to be tested;

Fig. 2 is a schematic circuit diagram of the preferred form of power supply forming a part of the anlyzer contemplated by this invention;

Figure 4A:
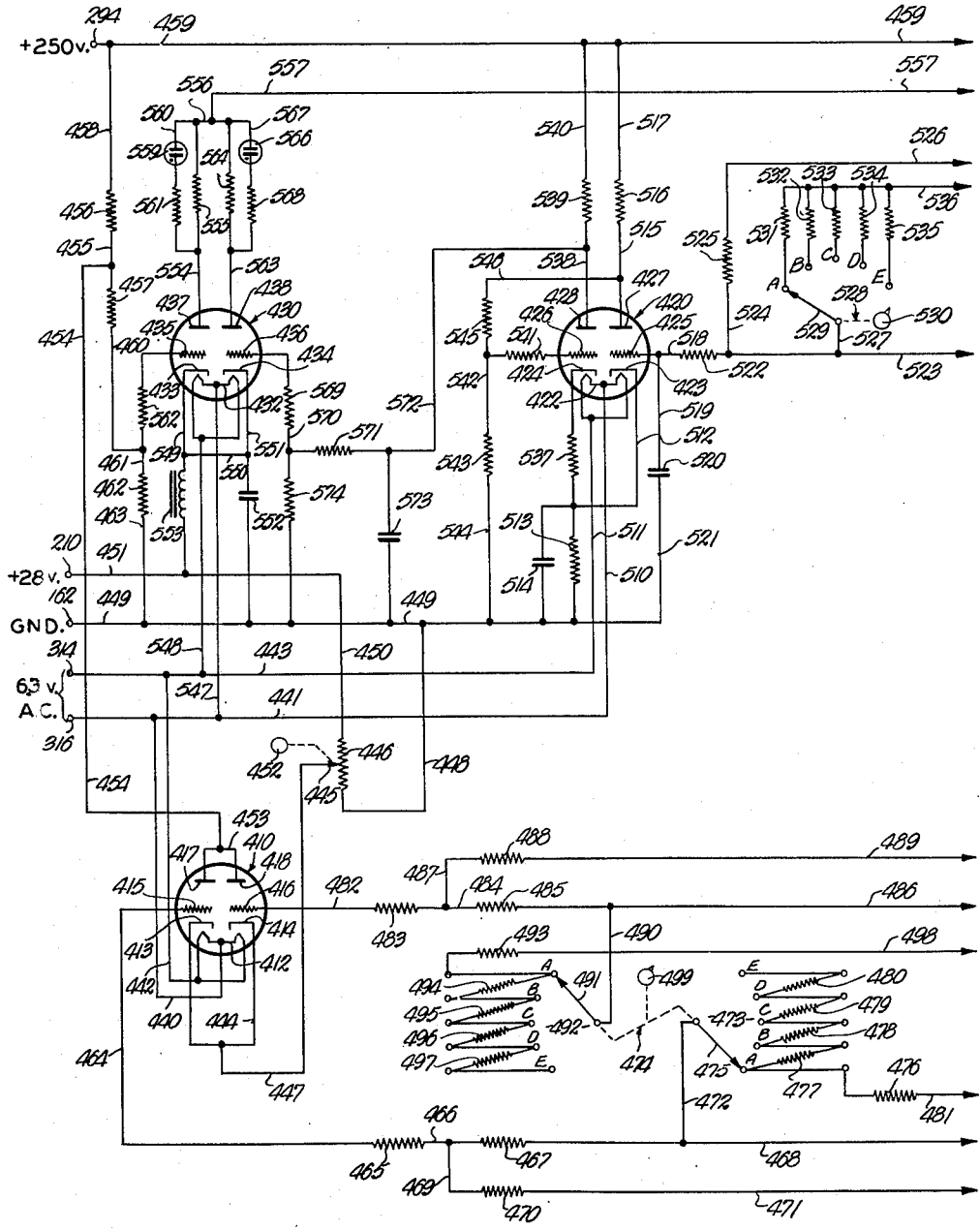
Figure 4B:
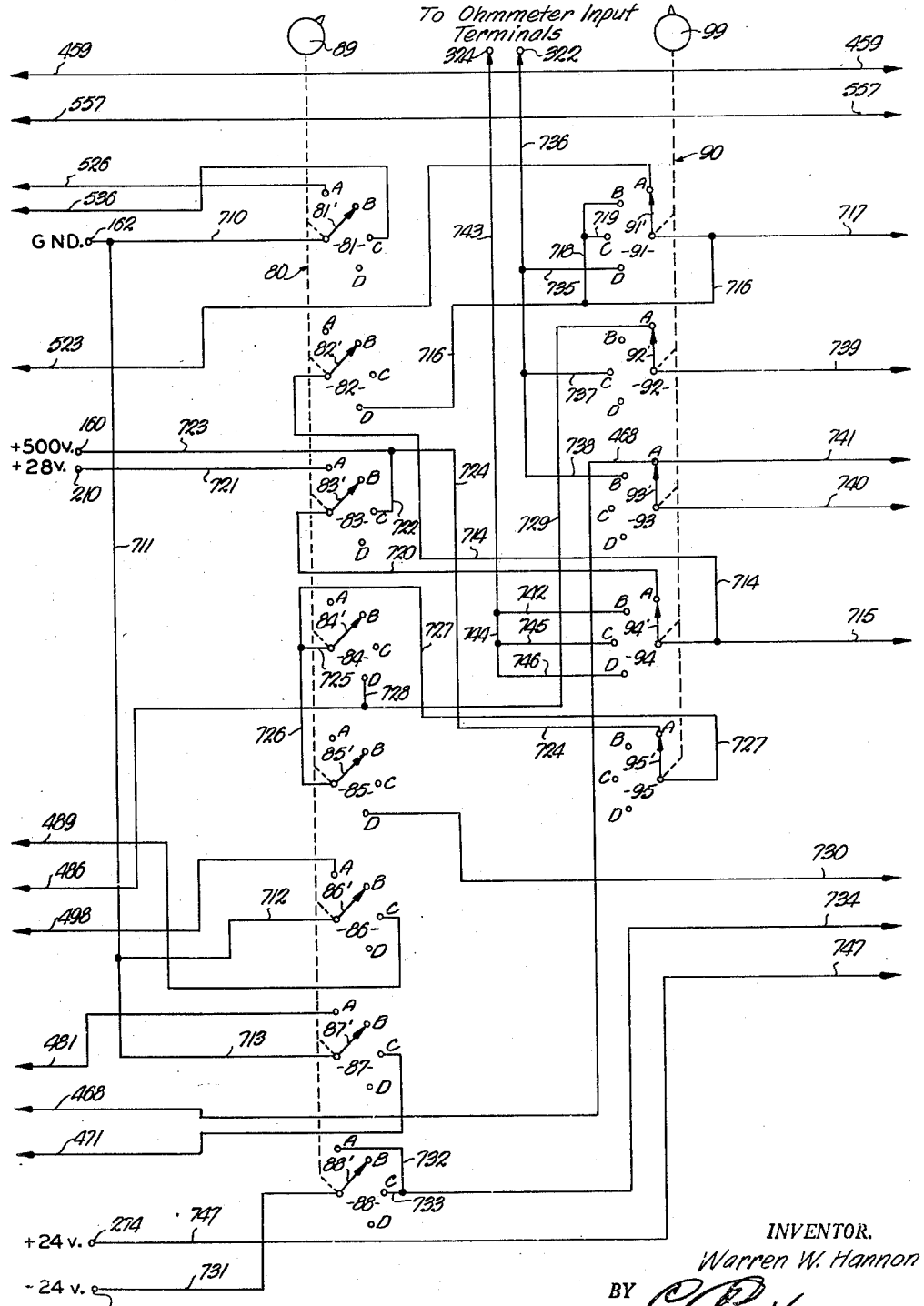
Figure 4C:
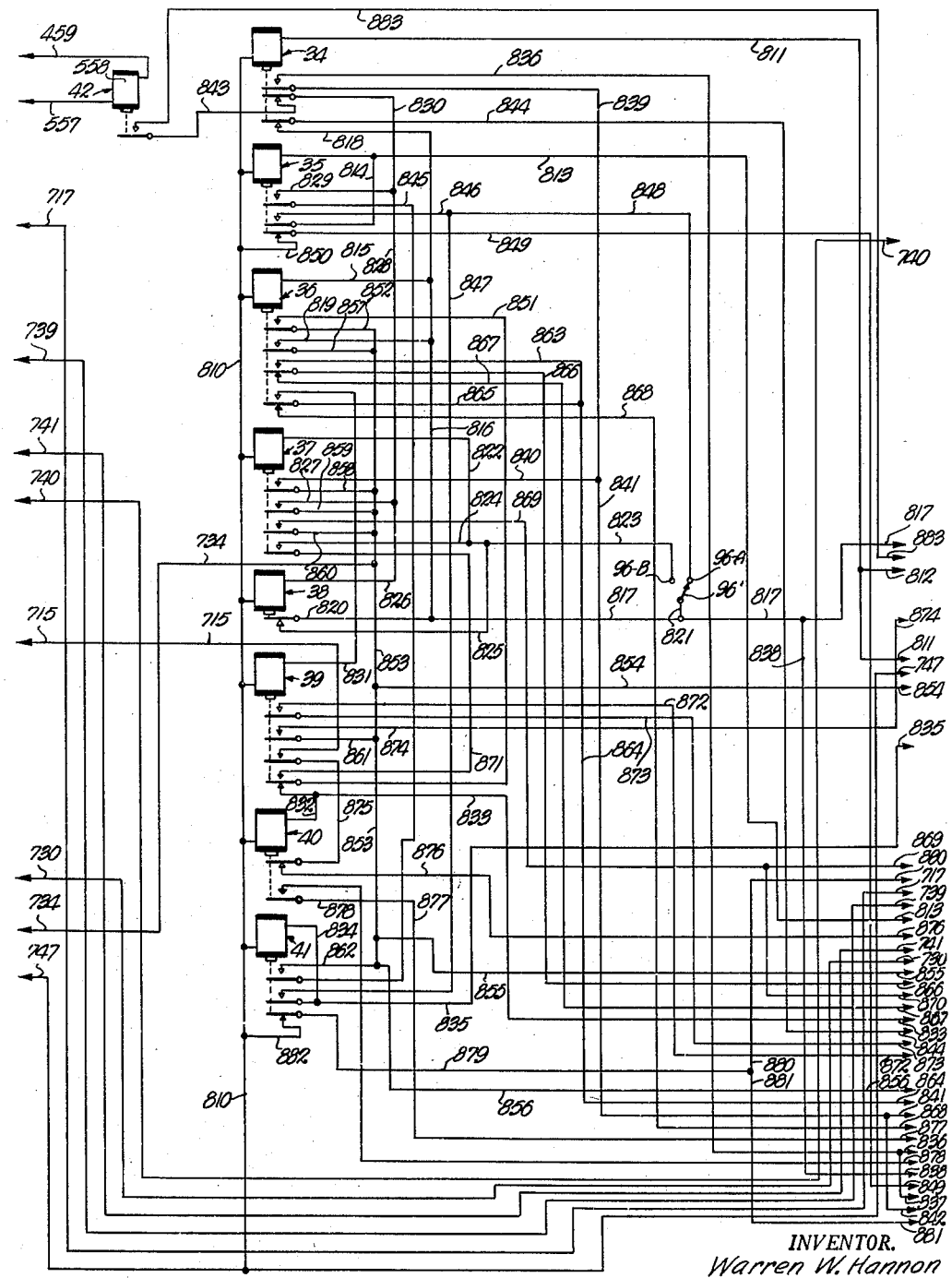

Fig. 3 is a schematic circuit diagram of the preferred form of ohmmeter forming a part of such analyzer; and Figs. 4–A, 4–B, 4–C, 4–D and 4–E together constitute a composite or mosaic, schematic circuit diagram of the remainder of the circuitry of one embodiment of this invention, it being noted that, in order to render the explanation of the invention as brief and clear as possible, the illustrative embodiment shown is a simplified version of the invention adapted for testing only a dozen circuits, whereas present commercial embodiments of the invention utilizing the same principles are adapted for the testing of systems involving as many as 1200 circuits and such number can be even further extended as may be desired. It may be further noted that Fig. 4–A relates principally to what may be termed the detection circuit of the anlyzer, Fig. 4–B relates principally to the test selection circuit, Fig. 4–C relates principally to the automatic switching control circuit, Fig. 4–D relates principally to the input switching circuit, and Fig. 4–E relates principally to the output switching circuit, the test identification matrix circuit and the external relay energization circuit.

The power supply

Referring first particularly to Fig. 2, the power supply circuit of the analyzer of this invention provides a low voltage, alternating current output of, for instance, 6.3 volts for operating tube filaments and indicator lamps, a high voltage, direct current output against ground of, for instance, 500 volts for use in circuit testing where insulation resistance or leakage is of particular interest and for use in the ohmmeter circuit of the analyzer, a medium high voltage, direct current output against ground of, for instance, 250 volts for use in connection with the vacuum tubes forming a part of the detector circuit of the analyzer and the advance relay associated therewith, an intermediate voltage, direct current output against ground of, for instance, 50 volts for use in the ohmmeter circuit, a medium voltage, direct current voltage output against ground of, for instance, 28 volts for use in circuit testing where line resistance is of particular interest and for use in the energization of external relays and the like, a low voltage, direct current output against ground of, for instance, 3.3 volts for use in the ohmmeter circuit of the analyzer, and a medium low voltage, isolated direct current output against an ungrounded negative terminal of, for instance, 24 volts for use in the control and switching circuits of the analyzer, the latter output being isolated from the common ground of the other direct current outputs in order to minimize the possibility of leakage current paths to circuit testing portions of the analyzer, as will hereinafter become apparent.

Although both the outputs referred to above and the means for producing same may be varied from those shown for illustration without departing from the principles of this invention, the presently preferred form of power supply circuit is as shown in Fig. 2 and includes a transformer 110 having a primary winding 112 adapted for coupling with a source of alternating current power represented by a pair of terminals 114 and 116, which will be understood to be on a plug 115 adapted for connection with conventional 115 volt supply line of generator (not shown), through a pair of conductors 118 and 120 respectively having the poles 122 and 124 of a main power switch 126 in series therewith. Transformer 110 is also provided with a high voltage secondary winding 128, a medium voltage secondary winding 130, a low voltage secondary winding 132, a medium low voltage secondary winding 134, and a low voltage, filament supply type, secondary winding 136, it being noted that a number of single secondary transformers could obviously be used in place of transformer 110 having multiple secondaries 128, 130, 132, 134 and 136.

A bridge rectifier unit 138 preferably using four selenium rectifiers 140, 142, 144 and 146 coupled in conventional arrangement has its input terminals 148 and 150 coupled with secondary 128 by means of conductors 152 and 154 and its output terminals 156 and 158 coupled with a 500 volt direct current supply terminal 160 and a ground terminal 162 respectively by conductor 164 and conductors 166, 168, 170 and 172. A filter capacitor 174 and a bleeder resistor 176 are coupled in parallel between conductors 164 and 166.

Similarly, a bridge rectifier unit 178 having rectifiers 180, 182, 184 and 186, input terminals 188 and 190, and output terminals 192 and 194 is coupled with secondary winding 130 by conductors 196 and 198 and with a 28 volt, direct current supply terminal 210 and ground terminal 162 respectively by conductor 212 and conductors 214, 170 and 162, there being a filtering capacitor 216 and a bleeder resistor 218 coupled in parallel between conductors 212 and 214; a bridge rectifier unit 220 having rectifiers 222, 224, 226 and 228, input terminals 230 and 232, and output terminals 234 and 236 is coupled with secondary winding 132 by conductors 238 and 240 and a 3.3 volt, direct current supply terminal 242 and ground terminal 162 respectively by conductor 244 and conductors 246 and 172, there being a filtering capacitor 248 and a bleeder resistor 250 coupled in parallel between conductors 244 and 246; and a bridge rectifier unit 252 having rectifiers 254, 256, 258 and 260, input terminals 262 and 264, and output terminals 266 and 268 is coupled with secondary winding 134 by conductors 270 and 272 and with a positive, 24 volt, direct current supply terminal 274 and a negative, 24 volt supply terminal 276 respectively by conductor 278 and conductor 280, there being a filtering capacitor 282 and a bleeder resistor 284 coupled in parallel between conductors 278 and 280.

A pair of ordinary voltage regulator tubes 286 and 288 and a resistance 290 are coupled in series in that order between conductors 166 and 164; and a conductor 292 couples a 250 volt, regulated, direct current supply terminal 294 (working against ground terminal 162) between tube 288 and resistance 290. A voltage divider comprised of a pair of resistances 296 and 298 in series are coupled between conductors 164 and 166, and a conductor 310 couples a 50 volt, direct current supply terminal 312 (working against ground terminal 162) between resistances 296 and 298. A pair of 6.3 volt, alternating current supply terminals 314 and 316 are coupled with secondary winding 136 by conductors 318 and 320.

The manner of operation of the power supply just described will be so obvious to those skilled in the art as to require no further explanation.

The ohmmeter

Although the ohmmeter forming an important part of the analyzer of this invention could be of various types, the preferred form of ohmmeter illustrated in Fig. 3, includes a pair of ohmmeter input terminals 322 and 324 adapted for coupling with a circuit whose resistance is to be measured as hereinafter explained, a current measuring meter 326 calibrated in terms of resistance, a two-gang resistance range selector switch 328 provided with a manual control knob 329 and having a pair of sections 330 and 332 respectively provided with simultaneously movable switch arms 331 and 333 and with switch contacts marked A, B, C, D, and E (hereinafter respectively referred to as 330-A, 330-B, 330-C, 330-D and 330-E) adapted to be selectively engaged by arm 331 and switch contacts marked A, B, C, D, and E (hereinafter respectively referred to as 332-A, 332-B, 332-C, 332-D and 332-E) adapted to be correspondingly engaged by arm 333.

Ohmmeter input terminals 322 and 324 are respectively coupled with switch arms 331 and 333 by conductors 334 and 336. Contacts 330-A, 330-B and 330-C are coupled with 3.3 volt supply terminal 242 by conductors 337, 338 and 340 respectively. Contact 330-D is coupled with 50 volt supply terminal 312 by conductor 342. Contact 330-E is coupled with 500 volt supply terminal 160 by conductor 344. A conductor 346 couples meter 326 with ground terminal 162 through a resistance 348, the other side of meter 326 being coupled with a conductor 350 through a manually variable, meter "zeroing" resistance 352 operably coupled with an adjustment knob 353. Four resistances 354, 356, 358 and 360 are coupled in series in that order between conductors 346 and 350 and in parallel with resistance 348, meter 326 and resistance 352. Contact 332-A is coupled with resistances 354 and 356 therebetween through a resistance 362. Contact 332-B is coupled with resistances 356 and 358 therebetween through a resistances 364. Contact 332-C is coupled with resistances 358 and 360 therebetween through a resistance 366. Contacts 332-D and 332-E are coupled with conductor 350 through resistances 368 and 370 respectively.

A normally open, shorting switch 372 is coupled between conductors 334 and 336 by conductors 374 and 376 for use in shorting ohmmeter input terminals 322 and 324 together while zeroing meter 326 by adjustment of knob 353 to vary resistance 352 in well known manner. It may be noted that, if meter 326 is a 0–25 microammeter, it may be calibrated to read resistance directly in ohms, ohms×100, ohms×1000, ohms×100,000 and megohms for positions A, B, C, D and E respectively of switch 328, where resistance 352 is variable from zero to 20,000 ohms and resistances 348, 354, 356, 358, 360, 362, 364, 366, 368 and 370 are respectively 1,000 ohms 1 ohm, 99 ohms, 900 ohms, 6,350 ohms, 7.6 ohms, 900 ohms, 9,000 ohms, 1 megohm and 10 megohms.

Although the manner of operation of the ohmmeter will be quite clear to those skilled in the art and should require no further explanation, it may be observed that, after selection of the desired resistance multiplier range by manipulation of switch 328, switch 372 may be temporarily closed and resistance 352 adjusted by knob 353 until the current flow through meter 326 is exactly of a "full scale" value indicating zero resistance. Upon opening of switch 372 the resistance of an external circuit (not shown) coupled across ohmmeter input terminals 322 and 324 may then be accurately read upon meter 326, it being understood that the resistance of said external circuit decreases the current flow through meter 326 and that the latter is calibrated to read in terms of resistance the magnitude of such decrease in current flow in accordance with the particular voltage selected by switch section 330 and the particular "multiplying resistance" arrangement correspondingly chosen by switch section 332.

Means for coupling with external circuits

In Fig. 4–D is illustrated an input board, plug, receptacle or the like generally designated 26 and having a plurality of input terminals numbered 1 to 12 inclusive. In Fig. 4–E, opposite receptacle 26 of Fig. 4–D, is shown an output board, plug, receptacle or the like generally designated 28 and having a plurality of output terminals numbered 13 to 24 inclusive. It will be understood that, in commercial embodiments of the invention, the number of terminals on each of receptacles 26 and 28 is many times greater than twelve, the latter number of terminals being here chosen for illustration in order to simplify explanation of the principles of the invention.

Each of a plurality of external, circuits (not shown) to be tested, in the case of such circuits having only two terminations or ends, has one of its ends coupled with one of the input terminals 1 to 12 inclusive and its other end coupled with the corresponding one of output terminals 13 to 24 inclusive (as will hereinafter become apparent, for this purpose, output terminal 13 corresponds to input terminal 1, output terminal 14 to input terminal 2, output terminal 15 to input terminal 3, etc.). In the case of multiple circuits having a common termination or end and a plurality of separate branch terminations or ends, the common end is coupled with one of input terminals 1 to 12 inclusive, and the branch ends coupled with certain ones of output terminals 13 to 24 inclusive, as will be hereinafter more fully explained.

In either case, however, it will be clear that the external circuits (not shown) to be tested may be conveniently coupled with the analyzer of this invention by means of adaptor cables (not shown) which couple at one end thereof with receptacles 26 and 28 and at the other end with the circuitry of the system or apparatus to be tested. It may be noted that such means of coupling with the circuitry under test is extremely convenient in checking aircraft wiring systems, cabling systems, marine wiring systems, and most other types of equipment upon which continuity and short checks must be performed, since such systems and equipment are normally provided with plug or receptacle terminations to which said adaptor cables (not shown) may be quickly and easily connected. It is even more significant, however, that, as will hereinafter become apparent, the analyzer of this invention is adapted for fully testing any system having a number of circuit terminations within the capacity of the embodiment of analyzer used, regardless of the particular configurations or multiple circuit nature of circuits in the system to be tested, without changing the internal wiring of the analyzer and merely by changing adaptor cables. In other words, the analyzer itself is of such nature and so flexible in operation as to be adapted for testing virtually any plural circuit system simply by the provision of appropriate adaptor cables for coupling the system with the analyzer. This means that only adaptor cables, rather than the analyzer itself, need be changed in order to test different systems, it being obvious that different cables will normally be required for different systems in any case to permit connection therewith. This invention, therefore, reduces the change required for testing different types of systems to an absolute minimum from the standpoints of both material and labor.

In Fig. 4–E is illustrated another termination board, plug, receptacle or the like generally designated 30 and having a number of terminals a, b, c, d, e, f, g, h, and i. Receptacle 30 is adapted for providing, on a controlled selective basis, power for energizing in predetermined order relays and the like forming a part of the system to be checked whose functioning is to be tested, it being understood that receptacle 30 will be coupled with the system under test by an adaptor cable (not shown) in the same manner as above described for receptacles 26 and 28. It may be noted that terminals a, b, c, and d are selectively energizable, positive power terminals, while terminals e, f and g are selectively energizable, negative terminals, terminals h and i being respectively a constantly energized, positive power terminal and a constantly energized, negative power terminal. It may also be noted that receptacle 30 may have, if desired, a plurality of interconnected terminals corresponding with each of terminals a to i inclusive to provide a greater number of connecting points for the adaptor cable (not shown). Similarly, although in the illustrated embodiment it is assumed for simplicity that the relays and the like in the external system to be tested will all operate from the 28 volt, direct current power, switching means (not shown) of obvious nature may be provided for switching to another type of power available from the power supply of the analyzer or from an external source (perhaps forming a part of the system under test); in a simple case, such means could consist of a switch (not shown) for disconnecting the 28 volt supply from terminals 210 and 162 in Fig. 4–E, so that an external power source (not shown) coupled with terminals h and i of receptacle 30 by the adaptor cable (not shown) could be used for energization of relays and the like in the circuit under test. It should be observed, however, that even though an external power source forming a part of the system under test were to be used, the desired control over selective energization of relays and the like forming a part of the system being tested can be accomplished from the site of the analyzer only by utilizing the receptacle 30 and the switching means (hereinafter to be identified) which is associated therewith.

It will also be noted in Fig. 1 that another receptacle 32 may optionally be provided for coupling with a remote indication and control panel (not shown), which it is not felt properly forms a part of the instant invention so as to require illustration or description.

Continuity and short detector

Referring now more particularly to Fig. 4–A, there is illustrated the electronic circuit used in the analyzer for the simultaneous detection of faults in continuity, namely, breaks or line resistance in excess of a predetermined value, and faults in inter-circuit isolation, namely, shorts or insulation resistance below a predetermined value. The detector circuit utilizes three double triode, vacuum tubes 410, 420 and 430.

Tube 410, which may be called the continuity detector tube, has a center-tapped filament 412, a first section of elements including a cathode 413, a grid 415 and a plate 417, and a second section of elements including a cathode 414, a grid 416 and a plate 418. Filament 412 has its center coupled with filament supply terminal 316 by conductors 440 and 441 and its ends coupled with filament supply terminal 314 by conductors 442 and 443. Cathodes 413 and 414 are coupled together by a conductor 444 and with the variable tap 445 of a potentiometer 446 by a conductor 447, potentiometer 446 having one end thereof coupled with ground terminal 162 through conductors 448 and 449 and the other end thereof coupled with the positive 28 volt supply terminal 210 by conductors 450 and 451. An adjustment knob 452 is provided for tap 445 of potentiometer 446. Plates 417 and 418 are interconnected by a conductor 453 and are coupled by a conductor 454 with a conductor 455 in turn interconnecting a pair of resistances 456 and 457, the opposite end of resistance 456 being coupled with positive 250 volt supply terminal 294 through a conductor 458 and a conductor 459, and the opposite end of resistance 457 being coupled with ground terminal 162 through a conductor 460 and a conductor 461, resistance 462, a conductor 463 and conductor 449, resistances 456, 457 and 462 obviously constituting a voltage divider.

Grid 415 is used for checking continuity in what will hereinafter be identified as single circuit test positions 1 to 4 inclusive, as well as in all multiple circuit test positions, while grid 416 is used for checking continuity in what will hereinafter be identified as single circuit test positions 5 to 12 inclusive, the purpose in keeping the continuity inputs from such classes of circuits to be tested separated by the alternate use of both sections of tube 410 being to facilitate maintenance of isolation between certain switching circuits hereinafter described in the most economical manner. The input circuits for grids 415 and 416 are electrically separate but identical.

Considering first grid 415, the latter is adapted for successive coupling, through switching means hereinafter described, with the extremity of an external circuit under test carrying a positive, direct current voltage relative to ground (if the circuit has continuity), by means of a conductor 464, a resistance 465, a conductor 466, a resistance 467 and a conductor 468, all in series in the order named and leading from grid 415 to said switching means hereafter to be identified. By further switching also to be later described, either conductor 466 may be grounded through a conductor 469, a resistance 470, a conductor 471 and said last mentioned switching means, or conductor 468 may be grounded through a conductor 472, one section 473 of a continuity range switch 474 having a movable switch arm 475 and a number of stationary contacts marked A, B, C, D, and E (hereinafter referred to as contacts 474–A, 474–B, etc.), those of a number of series connected resistances 476, 477, 478, 479 and 480 selected by the positioning of arm 475, and a conductor 481; since the positive input voltage from the external circuit enters on conductor 468, it will be obvious that same is tapped into a voltage divider between grid 415 and ground comprising, in the first case, resistances 465 and 470 with the tap therebetween, and, in the second case, resistances 465 and 467 and the resistances associated with switch section 473 with the tap between resistance 467 and switch arm 475. The first case prevails when a relatively high voltage (500 volts) is switched onto the circuit under test, and the latter case prevails, bringing continuity range switch 474 into the circuit of grid 415, when a relatively low voltage (28 volts) is being used to test the external circuit, all as hereinafter explained. In either case, grid 415 is obviously biased negatively relative to cathode 413 in the absence of a continuity signal input to conductor 468.

Similarly, connected with grid 416 is a conductor 482 leading through a resistance 483, a conductor 484, a resistance 485 and a conductor 486 to means discussed hereinafter for switching conductor 486 into connection with the positive voltage input from the particular external circuit under test. Likewise also, a conductor 487, a resistance 488 and a conductor 489 lead from conductor 484 to switchable means later described for grounding conductor 489; and a conductor 490 couples the movable arm 491 of a second section 492 of continuity range switch 474 with conductor 486, arm 491 being selectively engageable with any of a plurality of stationary contacts marked A, B, C, D and E (hereinafter referred to as contacts 492–A, 492–B, etc.) of switch section 492, and there being a number of series connected resistances 494, 495, 496 and 497 respectively between contacts 492–A to E inclusive with contact 492–A being connected through a resistance 493 and a conductor 498 with said switch means later to be described for alternately grounding conductor 489 or conductor 498. A manual operating knob 499 is coupled with continuity range switch 474 for simultaneously moving the arms 475 and 491 of sections 473 and 492 respectively.

Tube 420, which may be called the short detector tube, has a center-tapped filament 422, a first section of elements including a cathode 423, a grid 425 and a plate 427, and a second section of elements including a cathode 424, a grid 426 and a plate 428. Filament 422 has its center coupled with filament supply terminal 316 by conductors 510 and 441 and its ends coupled with filament supply terminal 314 by conductors 511 and 443.

Cathode 428 is coupled with ground terminal 162 through a conductor 512, a resistance 513 and conductor 449, there being a by-pass capacitor 514 coupled between conductors 512 and 449 in parallel with resistance 513. Plate 427 is coupled with the positive, 250 volt, supply terminal 294 through a conductor 515, a resistance 516, a conductor 517 and conductor 459. Grid 425 is by-passed to ground terminal 162 through a conductor 518, a conductor 519, a capacitor 520, a conductor 521 and conductor 449. Grid 425 is also adapted for coupling through conductor 518, a resistor 522 and a conductor 523 with switching means hereinafter to be identified for coupling conductor 523 with those of the external circuits in the system being tested not at the moment energized and coupled with continuity input line conductor 468 or 486. Further switching means later to be discussed are adapted for grounding conductor 523 either through a conductor 524, a resistance 525 and a conductor 526 or through a conductor 527, a switch 528 (having a movable arm 529, a number of stationary contacts A, B, C, D and E, hereinafter referred to as contacts 528–A, 528–B, etc., and a control knob 530), one of a number of parallel resistances 531, 532, 533, 534 and 535 respectively connected with contacts 528–A et seq., and a conductor 536. Obviously, depending upon whether conductor 526 or 536 is grounded, either resistances 522 and 525 or resistance 522 and one of resistances 531 et seq. form a voltage divider with conductor 523 tapped therebetween; in either case biasing action upon grid 425 is effected whenever leakage currents from external circuits not themselves intentionally energized for testing pass from conductor 523 through resistance 525 or one of resistances 531 et seq. to ground. The presence of such leakage currents obviously indicate either a short or insulation leakage from the particular external circuit energized for continuity testing and the mentioned other external circuits.

Cathode 424 is grounded through a resistance 537, resistance 513 and conductor 449 to ground terminal 162. Plate 428 is coupled with positive, 250 volt terminal 294 through a conductor 538, a resistance 539 and a conductor 540. Grid 426 is coupled with ground terminal 162 through a resistance 541, a conductor 542, a resistance 543, a conductor 544 and conductor 449. Grid 426 is also coupled with plate 427 through resistance 541, a resistance 545, a conductor 546 and conductor 515.

Tube 430, which may be called the mixer tube, has a center-tapped filament 432, a first section of elements including a cathode 433, a grid 435 and a plate 437, and a second section of elements including a cathode 434, a grid 436 and a plate 438.

Filament 432 has its center coupled with filament supply terminal 316 by conductors 547 and 441 and its ends coupled with filament supply terminal 314 by conductors 548 and 443. Cathodes 433 and 434 are coupled together by conductors 549, 550 and 551, are by-passed to ground terminal 162 through a capacitor 552 and conductor 449, and are coupled with positive, 28 volt supply terminal 210 through a choke coil 553 and conductor 451. Plate 437 is coupled with the positive, 250 volt supply terminal 294 through a conductor 554, a resistance 555, a conductor 556, a conductor 557 (see Figs. 4–A, 4–B and 4–C), the high voltage wound coil 558 of a relay 42 (Fig. 4–C) and conductor 459 (see Figs. 4–A, 4–B and 4–C). It may now be noted, although hereinafter more fully explained, that relay 42 is what is known as the advance relay and that it is the deenergization of this relay 42 that permits advancement of certain stepping switch mechanisms hereinafter identified. A continuity fault indicator 559, in the form of a neon glow lamp, is coupled between conductors 556 and 554, in parallel with resistance 555, by means of a conductor 560 and a series resistance 561. Grid 435 is coupled with plates 417 and 418 of continuity detector tube 410 through a resistor 562 coupled with conductor 461, thence through resistance 457 and conductors 454 and 453, it being that grid 435 is also coupled with ground terminal 162 through resistance 562, conductor 461, resistance 462 and conductors 463 and 449.

Plate 438 is coupled with the positive, 250 volt supply terminal 294 through a conductor 563, a resistance 564, conductors 556 and 557, coil 558 of advance relay 42 (Fig. 4–C), and conductor 459 (Figs. 4–A, 4–B and 4–C). A short fault indicator 566, in the form of a neon glow lamp, is coupled between conductors 556 and 563, in parallel with resistance 564, by means of a conductor 567 and a series resistance 568. It is noted that conductor 556 is common to resistances 555 and 564 and that current flow through conductor 557, coil 558 of advance relay 42 and conductor 459 is, therefore, dependent on the conduction of both sections of tube 430, while the continuity fault indicator 559 is dependent only on current flow through the section of tube 430 having plate 437, and the short fault indicator 556 is dependent only on current flow through the section of tube 430 having plate 438. Grid 436 is coupled with plate 428 of short detector tube 420 through a resistance 569, a conductor 570, a resistance 571, a conductor 572 and conductor 538. Conductor 572 is by-passed to ground terminal 162 through a capacitor 573 and conductor 449. Grid 436 is also coupled with ground terminal 162 through resistance 569, conductor 570, a resistance 574 and conductor 449.

Although the operation of the continuity and short detector circuit just described will probably be obvious to those skilled in the art, the following observations may facilitate full understanding. With all supply voltages connected, but no input connected either to continuity input conductor 468 (or 486) or to short input conductor 523, continuity detector tube 410 will be cut off or non-conducting by virtue of the cathode bias applied from potentiometer 446. This will raise the potential on plates 417 and 418, and accordingly on grid 435 of mixer tube 430, to a relatively high value causing sections 433—435—437 of mixer tube 430 to conduct heavily, thereby firing continuity fault lamp 559 to fire, as might be expected, and energizing coil 558 of relay 42. At the same time, with no leakage currents flowing through bias resistance 525 (or one of resistances 531 et seq.), section 423—425—427 of short detector tube 420 will be cut off or non-conducting by virtue of the cathode bias effected by resistance 513. This will raise the potential on plate 427, and accordingly on grid 426, to a relatively high value causing section 424—426—428 of tube 420 to conduct heavily, thereby lowering the potential on plate 428, and therefore grid 436 of mixer tube 430, to a relatively low value rendering section 434—436—438 of tube 430 cut off or non-conducting, thereby leaving short indicator lamp 566 unlit, as might be expected, and contributing no flow of current toward energization of coil 558 of relay 42.

Assuming next that the analyzer of the invention is in operation and that continuity input conductor 468 (or 486) is coupled with one end of a particular external circuit under test to whose other end a positive potential of 28 volts is applied and that short input conductor 523 is coupled with external circuits other than one directly energized as mentioned above, any of three conditions may obtain.

First, the particular external circuit under test may have a continuity fault, that is, be open or have a line resistance in excess of a predetermined value, and no short or leakage fault may exist; in this case, operation is exactly as above described for no inputs, except that, if the external circuit is not actually open but has excessive line resistance, instead of grid 415 (or 416) of tube 410 not being positively biased at all, it will simply be so biased insufficiently to overcome the cathode bias from potentiometer 446.

Secondly, the external circuit under test may have no continuity fault but may have a short fault, that is, be either shorted to or isolated by an insufficient insulation resistance from the external circuits coupled with short input conductor 523; in this case, the positive potential applied to grid 415 (or 416) of continuity detector tube 410 is sufficient to overcome the cathode bias on cathode 413 (or 414) thereof and tube 410 conducts heavily, lowering the potential on plate 417 (or 418) and grid 435 of mixer tube 430 to a value rendering section 433—435—437 cut off or non-conducting, thereby leaving continuity fault indicator lamp 559 deenergized and contributing no flow of current for energizing coil 558 of relay 42; meanwhile, however, flow of short or leakage currents through resistance 525 (or one of resistances 531 et seq.) biases grid 425 of short detector tube 420 positively to render section 423—425—427 thereof heavily conductive, lowering the potential on plate 427, and accordingly grid 426, sufficiently to render section 424—426—428 of tube 420 cut off or non-conductive, thereby raising the potential on plate 428, and therefore grid 436 of mixer tube 430, sufficiently to cause section 434—436—438 to conduct heavily so that short fault indicator lamp 566 is fired and coil 558 of relay 42 is energized.

Thirdly, there may be neither a continuity fault or a short fault; in this case, from what has been said above, both sections of mixer tube 430 are obviously cut off or non-conducting, both fault indicating lamps 559 and 566 are dark, and coil 558 of relay 42 is deenergized, permitting the step switching means hereinafter described to function to shift automatically to the next external circuit to be tested in the manner to be explained.

As will be clear, adjustment of potentiometer tap 445 by knob 452 controls the cathode bias, and therefore the sensitivity, of continuity detector tube 410; adjustment of continuity range switch 474 by knob 499 controls the nature of grid circuit voltage dividers of tube 410, and accordingly the maximum value of line resistance to be deemed permissible for a particular set of external circuits to be tested; and adjustment of the short range switch 528 by knob 530 controls the size of the biasing resistance for grid 425, and accordingly the maximum amount of inter-circuit leakage (or the minimum amount of inter-circuit insulation resistance) to be deemed permissible for a particular set of external circuits to be tested.

Finally, in this connection, it may be observed that switching means shortly to be discussed are provided for checking external circuits under excitation of either a relatively high voltage of 500 volts or a relatively low voltage of 28 volts. With such high voltage excitation, the insulation resistance checking function of the continuity and short detector becomes extremely precise, while with the lower voltage excitation the line resistance checking function of the detector enjoys its optimum precision, the other function in each case, however, being performed with a useful degree of accuracy.

*The control, circuit switching and circuit-under-test indicating circuitry*

Referring now more particularly to Fig. 4–B, there is shown a test selection switch 80 having a number of ganged sections 81 to 88 inclusive each having a movable arm 81′, 82′ etc. respectively engageable with either of four contacts marked A, B, C and D respectively and hereinafter referred to by the numeral assigned to the section and the letter assigned to the contact thereof, for example, contact 81–A. A knob 89 is provided for the simultaneous movement of all of arms 81′ et seq., it being noted that contacts 81–A, 82–A, etc. correspond to the so-called low voltage test condition, contacts 81–B, 82–B, etc. correspond to the off or inoperative condition, contacts 81–C, 82–C, etc. correspond to the so-called high voltage test position, and contacts 81–D, 82–D, etc. correspond to the so-called short resistance only condition.

Also shown in Fig. 4–B is a meter selection switch 90 having a number of ganged sections 91 to 95 inclusive each having a movable arm 91', 92' etc. respectively engageable with either of four contacts marked A, B, C and D respectively and hereinafter referred to by the numeral assigned to the section and the letter assigned to the contact thereof, for example, contact 91–A. A knob 99 is provided for the simultaneous movement of all of arms 91' et seq., it being noted that contacts 91–A, 92–A, etc. correspond to the normal fault detecting or testing condition, while the other contacts of sections 91 et seq. correspond to various conditions for using the ohmmeter of the analyzer to more fully discover the nature of a fault once it has been detected.

Still referring principally to Fig. 4–B, arm 81' is coupled with ground terminal 162 by conductor 710, with arm 86' by conductors 710, 711 and 712, and with arm 87' by conductors 710, 711 and 713. Contact 81–A is coupled with conductor 526 from Fig. 4–A. Contact 81–C is coupled with conductor 536 from Fig. 4–A. Arm 82' is coupled with arm 94' by conductors 714 and 715. Contact 82–D is coupled with arm 91' by conductors 716 and 717, with contact 91–B by conductors 716 and 718, and with contact 91–C by conductors 716, 718 and 719. Arm 83' is coupled with contact 94–A by conductor 720. Contact 83–A is coupled with positive, 28 volt supply terminal 210 by conductor 721. Contact 83–C is coupled with positive, 500 volt supply terminal 160 by conductors 722 and 723, and with contact 95–A by conductors 722 and 724. Arm 84' is coupled with arm 85' by conductors 725 and 726, and with arm 95' by conductors 725 and 727. Contact 84–D is coupled with conductor 486 from Fig. 4–A by conductor 728, and with contact 92–A by conductors 728 and 729. Contact 85–D is coupled with conductor 730. Contact 86–A is coupled with conductor 498 from Fig. 4–A. Contact 86–C is coupled with conductor 489 from Fig. 4–A. Contact 87–A is coupled with conductor 481 from Fig. 4–A. Contact 87–C is coupled with conductor 471 from Fig. 4–A. Arm 88' is coupled with negative, 24 volt supply terminal 276 by conductor 731. Contact 88–A is coupled with contact 88–C by conductors 732 and 733, and with conductor 734. Contact 91–A is coupled with conductor 523 from Fig. 4–A. Contact 91–D is coupled with ohmmeter terminal 322 by conductors 735 and 736, with contact 92–C by conductors 735 and 737, and with contact 93–B by conductors 735 and 738. Arm 92' is coupled with conductor 739. Arm 93' is coupled with conductor 740. Contact 93–A is coupled with conductor 468 from Fig. 4–A, and with conductor 741. Contact 94–A is coupled with ohmmeter terminal 324 by conductors 742 and 743, with contact 94–C through conductors 742, 744 and 745, and with contact 94–D through conductors 742, 744 and 746. A conductor 747 is coupled with positive, 24 volt supply terminal 274.

Referring now to Figs. 4–C and 4–D there is shown, in Fig. 4–C, a number of relays numbered 34 to 41 inclusive and, in Fig. 4–D, a number of relays numbered 43 to 49. The advance relay 42 is also shown in Fig. 4–C, as already noted. Since it appears that the cause of clarity of both illustration in the drawings and description in the specification will best be served by not assigning a separate numeral to each of the coils and switch contacts of relays 34 to 49 inclusive, but rather by referring to the coils by the numeral assigned to the relay and by first fully describing the various switch contacts of each relay below and then hereinafter referring to same by the numeral of the relay and a letter (from A to J) indicating their relative proximity to the coil of the relay. Accordingly, such course will be followed.

Relay 34 has, proceeding from the coil thereof, a normally open switch including a stationary contact 34–A and a movable contact 34–B; a normally closed switch including a movable contact 34–C and a stationary contact 34–D; and a normally closed switch including a movable contact 34–E and a stationary contact 34–F.

Relay 35 has, proceeding from the coil thereof, a normally open switch including a stationary contact 35–A and a movable contact 35–B; a normally open switch including a stationary contact 35–C and a movable contact 35–D; and a normally closed switch including a movable contact 35–E and a stationary contact 35–F.

Relay 36 has, proceeding from the coil thereof, a normally open switch including a stationary contact 36–A and a movable contact 36–B; a normally open switch including a stationary contact 36–C and a movable contact 36–D; a double throw switch including a normally open, stationary contact 36–E, a movable contact 36–F and a normally closed, stationary contact 36–G; and a double throw switch including a normally open, stationary contact 36–H, a movable contact 36–I and a normally closed, stationary contact 36–J.

Relay 37 has, proceeding from the coil thereof, a normally open switch including a stationary contact 37–A and a movable contact 37–B; a normally open switch including a stationary contact 37–C and a movable contact 37–D; a normally open switch including a stationary contact 37–E and a movable contact 37–F; and a normally open switch including a stationary contact 37–G and a movable contact 37–H.

Relay 38 has, proceeding from the coil thereof, a normally closed switch including a movable contact 38–A and a stationary contact 38–B.

Relay 39 has, proceeding from the coil thereof, a normally open switch including a stationary contact 39–A and a movable contact 39–B; a normally open switch including a stationary contact 39–C and a movable contact 39–D; a normally open switch including a stationary contact 39–E and a movable contact 39–F; and a double throw switch including a normally open, stationary contact 39–G, a movable contact 39–H and a normally closed, stationary contact 39–I.

Relay 40 has, proceeding from the coil thereof, a normally closed switch including a movable contact 40–A and a stationary contact 40–B; and a normally closed switch including a movable contact 40–C and a stationary contact 40–D.

Relay 41 has, proceeding from the coil thereof, a normally open switch including a stationary contact 41–A and a movable contact 41–B; a normally open switch including a stationary contact 41–C and a movable contact 41–D; and a normally closed switch including a movable contact 41–E and a stationary contact 41–F.

Relay 42 has, proceeding from coil 558 thereof, a normally open switch including a stationary contact 42–A and a movable contact 42–B.

Relay 43 (Fig. 4–D) has, proceeding from the coil thereof, a normally closed switch including a movable contact 43–A and a stationary contact 43–B; a normally closed switch including a movable contact 43–C and a stationary contact 43–D; and a normally closed switch including a movable contact 43–E and a stationary contact 43–F.

Relay 44 (Fig. 4–D) has, proceeding from the coil thereof, a normally closed switch including a movable contact 44–A and a stationary contact 44–B; a normally closed switch including a movable contact 44–C and a stationary contact 44–D; and a normally closed switch including a movable contact 44–E and a stationary contact 44–F.

Relay 45 (Fig. 4–D) has, proceeding from the coil thereof, a normally closed switch including a movable contact 45–A and a stationary contact 45–B; a normally closed switch including a movable contact 45–C and a stationary contact 45–D; and a normally closed switch including a movable contact 45–E and a stationary contact 45–F.

Relay 46 (Fig. 4–D) has, proceeding from the coil thereof, a normally closed switch including a movable contact 46–A and a stationary contact 46–B; a normally closed switch including a movable contact 46–C and a stationary contact 46-D; and a normally closed switch including a movable contact 46-E and a stationary contact 46-F.

Relay 47 (Fig. 4-D) has, proceeding from the coil thereof, a normally open switch including a stationary contact 47-A and a movable contact 47-B; a normally open switch including a stationary contact 47-C and a movable contact 47-D; and a normally open switch including a stationary contact 47-E and a movable contact 47-F.

Relay 48 (Fig. 4-D) has, proceeding from the coil thereof, a normally open switch including a stationary contact 48-A and a movable contact 48-B; a normally open switch including a stationary contact 48-C and a movable contact 48-D; and a double throw switch including a normally open, stationary contact 48-E, a movable contact 48-F and a normally closed, stationary contact 48-G.

Relay 49 (Fig. 4-D) has, proceeding from the coil thereof, a double throw switch including a normally open, stationary contact 49-A, a movable contact 49-B and a normally closed, stationary contact 49-C; and a normally open switch including a stationary contact 49-D and a movable contact 49-E.

It should be noted that each pair of interengageable relay contacts are preferably provided with arc suppressing means (not shown) bridged thereacross, which may conventionally consist of a capacitor and a resistance connected in series, as is well known in the art.

Also shown on Fig. 4-C is a manual reset switch 96, preferably of the push button type and comprised of a movable contact 96' normally in engagement with a contact 96-A but manually shiftable out of engagement with contact 96-A and into engagement with a contact 96-B.

Still referring to Fig. 4-C, one side of each of coils 34 to 41 inclusive is coupled with conductor 747 through a common conductor 810. The other side of coil 34 is coupled with a conductor 811 and a conductor 812. The other side of coil 35 is coupled with a conductor 813 and, through a conductor 814, with contact 35-D. The other side of coil 36 is coupled through conductors 815 and 816 with conductor 817, through conductors 815, 816 and 817 with conductor 838, through conductors 815 and 818 with contact 34-F, through conductors 815, 816 and 819 with contact 36-C, through conductors 815, 816 and 820 with contact 38-A, and through conductors 815, 816, 817 and 821 with reset switch arm 96'. The other side of coil 37 is coupled through conductors 822 and 823 with reset switch contact 96-B, through conductors 822 and 824 with contact 37-G, and through conductors 822, 824 and 825 with contact 38-B. The other side of coil 38 is coupled through conductors 826 and 827 with contact 37-C, through conductors 826, 828 and 829 with contact 35-A, and through conductors 826, 828 and 830 with contact 34-C. The other side of coil 39 is coupled through a conductor 831 with contact 36-H. The other side of coil 40 is coupled through conductor 832 with contact 39-I and with conductor 833. The other side of coil 41 is coupled through conductor 834 with contact 41-D and with conductor 835.

Contact 34-A is coupled with conductor 836, and through conductor 836 with conductor 837. Contact 34-B is coupled through conductors 839 and 840 with contact 37-A, through conductor 839 with conductor 841, and through conductors 839 and 841 with conductor 842. Contact 34-D is coupled through conductor 843 with contact 42-B. Contact 34-E is coupled with conductor 844. Contact 35-B is coupled through conductor 845 with contact 41-B. Contact 35-C is coupled through conductors 846 and 847 with contact 41-C, and through conductors 846 and 848 with reset switch contact 96-A. Contact 35-E is coupled with conductor 849. Contact 35-F is coupled through conductor 850 with the relay common conductor 810. Contact 36-A is coupled through a conductor 851 with contact 39-H. Contact 36-B is coupled through conductors 852 and 853 with conductor 854, through conductors 852 and 853 with conductor 855, through conductors 852 and 853 with conductor 856, through conductors 852, 853 and 857 with contact 36-D, through conductors 852, 853 and 858 with contact 37-B, through conductors 852, 853 and 859 with contact 37-D, through conductors 852, 853 and 860 with contact 37-F, through conductors 852 and 853 with conductor 734 from Fig. 4-B, through conductors 852, 853 and 861 with contact 39-D, and through conductors 852, 853 and 862 with contact 41-A. Contact 36-E is coupled through conductor 863 with conductor 864, and through conductors 863 and 865 with contact 36-I. Contact 36-F is coupled with conductor 866. Contact 36-G is coupled with conductor 867. Contact 36-J is coupled with conductor 868. Contact 37-E is coupled with conductor 869, and through conductor 869 with conductor 870. Contact 37-H is coupled through conductor 871 with contact 39-G. Contact 39-A is coupled with conductor 872. Contact 39-B is coupled with conductor 873. Contact 39-C is coupled with conductor 874. Contact 39-E is coupled with conductor 715 from Fig. 4-B. Contact 39-F is coupled through conductor 875 with contact 40-A. Contact 40-B is coupled with conductor 876. Contact 40-C is coupled with conductor 877. Contact 40-D is coupled with conductor 878. Contact 41-E is coupled through conductor 879 with conductor 880 and with conductor 881. Contact 41-F is coupled through conductor 882 with relay common conductor 810. Contact 42-A is coupled with conductor 883.

Referring now particularly to Fig. 4-D, there is illustrated an input selecting, stepping switch 50 having a number of ganged banks 51, 52, 53, 54 and 55 each provided with a double extending switch arm respectively designated 51', 52', etc. and with a number of contacts marked, A, B, C, D and E (hereinafter referred to by the numeral assigned to the bank and the letter assigned to the contact, for example, contact 51-A). It will be noted that contacts 51-E, 52-E, etc. represent the "home" or "next to start" position of the arms 51' et seq.; and that arms 51' et seq. are continuously rotatable so as to contact contacts A, B, C, D and E in succession, then contact A again. Switch 50 also includes a solenoid 56 operably connected with each of switch arms 51' et seq. in such manner as to advance all of the latter simultaneously one contact or step each time the solenoid 56 is deenergized after energization thereof. It may be noted that stepping switch 50, as well as the other stepping switches hereinafter to be identified, may be of the type used in central telephone exchange stations, such as those commercially available from Automatic Electric Corporation of Chicago, Illinois. Also associated with switch 50 is a double throw switch generally designated 57 having a normally closed uppermost stationary contact hereinafter referred to as contact 57-A, a certain movable contact hereinafter referred to as contact 57-B and a lowermost normally open contact hereinafter referred to as contact 57-C. Contact 57-B remains in engagement with contact 57-A while switch arms 51' et seq. are in engagement with all of the contacts of switch banks 51 et seq. except contacts E thereof and shifts out of engagement with contacts 57-A and into engagement with contact 57-B when switch arms 51' et seq. are in a position engaging contacts E of switch banks 51 et seq. Also associated with stepping switch 50 is a normally closed circuit interrupter switch generally designated 58 having an uppermost stationary contact hereinafter referred to as contact 58-A and a lowermost movable contact hereinafter referred to as contact 58-B. Normally closed switch 58 opens whenever solenoid 56 is energized.

Also shown on Fig. 4-D is a multiple circuit selector switch 100 having a number of ganged sections 101, 102, 103, 104, 105 and 106 each provided with a movable switch arm 101', 102', etc. respectively, all interconnected for simultaneous movement by a control knob 109. Each of switch sections 101 et seq. is provided with a number of contacts marked A, B, C, D and E, hereinafter referred to by the numeral assigned to the switch section and the letter assigned to the contact, for example, contact 101–A.

Referring now particularly to the wiring of Fig. 4–D, arm 51′ is coupled with conductor 740 from Fig. 4–C. Arm 52′ is coupled through a conductor 910 with contact 48–F. Arm 53′ is coupled through a conductor 911 with contact 49–B. Arm 54′ is coupled with conductor 874 from Fig. 4–C. Arm 55′ is coupled with conductor 835 from Fig. 4–C. Contact 51–A is coupled through a conductor 912 with terminal 1 through conducting means 913 with contacts 101–B, 101–C, 101–D and 101–E, through conducting means 914 with contacts 102–D and 102–E, through conductive means 915 with contact 103–E, and through conductor 916 with contact 43–E. Contact 51–B is coupled through conductor 917 with arm 101′. Contact 51–C is coupled through conductor 918 with arm 102′. Contact 51–D is coupled through conductor 919 with arm 103′. Contact 52–A is coupled through conductor 920 with terminal 5, and through conductor 921 with contact 43–C. Contact 42–B is coupled through conductor 922 with terminal 6, and through conductor 923 with contact 44–C. Contact 52–C is coupled through conductor 924 with terminal 7, and through conductor 925 with contact 45–C. Contact 52–D is coupled through conductor 926 with terminal 8 and through conductor 927 with contact 46–C. Contact 53–A is coupled through conductor 928 with terminal 9, and through conductor 929 with contact 43–A. Contact 53–B is coupled through conductor 930 with terminal 10, and through conductor 931 with contact 44–A. Contact 53–C is coupled through conductor 932 with terminal 11, and through conductor 933 with contact 45–A. Contact 53–D is coupled through conductor 934 with terminal 12, and through conductor 935 with contact 46–A. Contact 54–A is coupled with conductor 936, and through conductor 937 with one side of relay coil 33. Contact 54–B is coupled through conductor 938 with one side of relay coil 44. Contact 54–C is coupled through a conductor 939 with one side of relay coil 45. Contact 54–D is coupled through a conductor 940 with one side of relay coil 46. One side of relay coil 47 is coupled with a conductor 941. One side of relay coil 48 is coupled with a conductor 942. One side of relay coil 49 is coupled with a conductor 943. The opposite sides of relay coils 43 to 49 inclusive are coupled with conductors 747 from Fig. 4–C. Contact 54–E is coupled with conductor 811 from Fig. 4–C. Contact 55–A is coupled with a conductor 944. Contact 55–B is coupled with a conductor 945. Contact 55–C is coupled with a conductor 946. Contact 55–D is coupled with a conductor 947.

Contact 101–A is coupled through a conductor 948 with terminal 2, through conductor means 949 with contacts 104–B, 104–C, 104–D and 104–E, and through conductor 950 with contact 44–E. Contacts 102–A, 102–B and 102–C are coupled through conductive means 951 and a conductor 952 with terminal 3, through a conductor 953 with contact 103–C, through conductive means 954 with contacts 105–D and 105–E, and through a conductor 955 with contact 55–E. Contacts 103–A, 103–B and 103–D are coupled through conductive means 956 and a conductor 957 with terminal 4, through conductive means 958 with contacts 106–C and 106–E, and through a conductor 959 with contact 46–E. Contacts 104–A, 105–A, 105–B, 105–C, 106–A, 106–B and 106–D are coupled through conductive means 960 and a conductor 961 with contacts 43–B and 43–D, through conductive means 960 and a conductor 962 with contacts 44–B and 44–D, through conductive means 960 and a conductor 963 with contacts 45–B and 45–D, and through conductive means 960 and a conductor 964 with contacts 46–B, 46–D and 46–F. Arm 104′ is coupled through a conductor 965 with contact 43–F. Arm 105′ is coupled through a conductor 966 with contact 44–F. Arm 106′ is coupled through a conductor 967 with contact 45–F.

Stepping solenoid 56 is coupled with conductors 869 and 880 from Fig. 4–C. Contact 58–A is coupled with conductor 955 from Fig. 4–C. Contact 58–B is coupled with conductor 866 from Fig. 4–C. Contact 57–A is coupled with conductor 870 from Fig. 4–C. Contact 57–B is coupled with conductor 867 from Fig. 4–C. Contact 57–C is coupled with conductor 833 from Fig. 4–C. Arm or contact 97′ of the normal-alternate switch is coupled with conductor 876 from Fig. 4–C, and through a conductor 968 with contact 49–D. Contact 97–A is coupled through a conductor 969 with contact 48–C, and through a conductor 970 with contact 47–A. Contact 97–B is coupled through a conductor 971 with contact 48–B, and through a conductor 972 with contact 47–C. Contact 47–B is coupled with a conductor 973 and through a conductor 974 with contact 48–A. Contact 47–D is coupled with a conductor 975, and through a conductor 976 with contact 48–D. Contact 47–E is coupled with conductor 741 from Fig. 4–C. Contact 47–F is coupled with conductor 730 from Fig. 4–C. Contact 48–E is coupled with conductor 739 from Fig. 4–C, and through a conductor 977 with contact 49–A. Contact 48–G is coupled with conductor 717 from Fig. 4–C, and through a conductor 978 with contact 49–C. Contact 49–E is coupled with a conductor 979.

Referring now particularly to Fig. 4–E, there is illustrated an output selecting, stepping switch 60 having a number of ganged banks 61, 62, 63, 64 and 65 each provided with a double extending switch arm respectively designated 61′, 62′, etc. and with a number of contacts marked A, B, C, D and E (hereinafter referred to by the numeral assigned to the bank and the letter assigned to the contact, for example, contact 61–A). It will be noted that contacts 61–E, 62–E, etc. represent the "home" or "next to start" position of the arms 61′ et seq.; and that arms 61′ et seq. are continuously rotatable so as to contact contacts A, B, C, D and E in succession, then contact A again. Switch 60 also includes a solenoid 66 operably connected with each of switch arms 61′ et seq. in such manner as to advance all of the latter simultaneously one contact or step each time the solenoid 66 is deenergized after energizaton thereof. Also associated with switch 60 is a double throw switch generally designated 67 having a normally closed, uppermost stationary contact hereinafter referred to as contact 67–A, a certain movable contact hereinafter referred to as contact 67–B and a lowermost normally open contact hereinafter referred to as contact 67–C. Contact 67–B remains in engagement with contact 67–A while switch arms 61′ et seq. are in engagement with all of the contacts of switch banks 61 et seq. except contacts E thereof and shifts out of engagement with contact 67–A and into engagement with contact 67–B when switch arms 61′ et seq. are in a position engaging contacts E of switch banks 61 et seq. Also associated with stepping switch 60 is a normally closed circuit interrupter switch generally designated 68 having an uppermost stationary contact hereinafter referred to as contact 68–A and a lowermost movable contact hereinafter referred to as contact 68–B. Normally closed switch 68 opens whenever solenoid 66 is energized.

Also shown on Fig. 4–E is a bank selecting, stepping switch 70 having a number of ganged banks 71, 72, 73, 74 and 75 each provided with a double extending switch arm respectively designated 71′, 72′, etc. and with a number of contacts marked A, B, C and D (hereinafter referred to by the numeral assigned to the bank and the letter assigned to the contact, for example, contact 71–A). It will be noted that contacts 71–D, 72–D, etc. represent the "home" or "next to start" position of the arms 71′ et seq.; and that arms 71′ et seq. are continuously rotatable so as to contact contacts A, B, C and D in succession, then contact A again. Switch 70 also includes a solenoid 76 operably connected with each of switch arms 71′ et seq. in such manner as to advance all of the latter simultaneously one contact or step each time the solenoid 76 is deenergized after energization thereof. Also associated with switch 70 is a double throw switch generally designated 77 having a normally closed uppermost stationary contact hereinafter referred to as contact 77-A, a certain movable contact hereinafter referred to as contact 77-B and a lowermost normally open contact hereinafter referred to as contact 77-C. Contact 77-B remains in engagement with contact 77-A while switch arms 71' et. seq. are in engagement with all of the contacts of switch banks 71 et seq. except contacts D thereof and shifts out of engagement with contact 77-A and into engagement with contact 77-B when switch arms 71' et seq. are in a position engaging contacts D of switch banks 71 et seq. Also associated with stepping switch 70 is a normally closed circuit interrupter switch generally designated 78 having an uppermost stationary contact hereinafter referred to as contact 78-A and a lowermost movable contact hereinafter referred to as contact 78-B. Normally closed switch 78 opens whenever solenoid 76 is energized.

Referring now to Fig. 1, as well as Fig. 4-E, the numeral 900 generally designates a matrix chart corresponding to a particular set of external circuits to be tested. Chart 900 is adapted to be removably held upon the front panel 901 of the analyzer housing or case generally designated 902 by any suitable means (not shown). Matrix chart 900 has written or printed in each of a plurality of grid squares 903 provided thereon markings 904 for identifying the input and output terminals of the external circuit corresponding with the particular testing position indicated by such grid square 903 of matrix chart 900. The markings 904 are represented only in Fig. 4-E and there only by the numerals 1 to 12 inclusive corresponding to the test positions defined by input terminals 1 to 12 inclusive, it being noted however that the type of chart 900 preferably used would actually spell out the identity of the input and output terminals of the external circuit for each matrix square 903 in sufficient detail to permit their identification without reference to a schematic diagram of the external system under test. Squares 903, each corresponding to a particular test position which will hereinafter be referred to as positions 1 to 12 inclusive, are arranged, in the simplified example chosen for illustration, in four vertical columns 1000, 1001, 1002 and 1003 and in three horizontal rows 1010, 1011 and 1012, it being understood that more columns and rows are shown on the chart 900 appearing in the representation of Fig. 1 of a commercial embodiment of the invention. For each of columns 1000 et seq. there is provided a column indicating lamp 1020, 1021, 1022 and 1023 respectively. Similarly, for each of horizontal rows 1010, 1011 and 1012 there is provided a row indicating lamp 1030, 1031 and 1032 respectively. For each of vertical columns 1000, 1001, 1002 and 1003 there is also provided a double pole single throw stop switch 1040, 1041, 1042 and 1043 respectively, each having a normally open switch (uppermost in Fig. 4-E) including a movable arm hereinafter referred to by the numeral assigned to the switch and the letter A, for example, contact 1040-A, and a stationary contact hereinafter referred to by the numeral assigned to the switch and the letter B, for instance, contact 1040-B. Each of switches 1040 et seq. also includes a normally closed switch including a movable contact arm ganged with contact arm A of the switch hereinafter referred to by the numeral assigned to the switch and the letter D, for example, 1040-D, and a stationary contact hereinafter referred to by the numeral assigned to the switch and the letter C, for example, contact 1040-C. Similarly, for each horizontal row of matrix squares 1010, 1011 and 1012 there is provided a double pole switch 1050, 1051 and 1052 respectively each having a single throw normaly open section (leftmost in Fig. 4-E) including a movable contact arm hereinafter identified by the number of the switch and the letter A and a stationary contact hereinafter identified by the number of the switch and the letter B, and a double throw section (rightmost in Fig. 4-E) including a normally closed stationary contact hereinafter identified by the number of the switch and the letter C, a movable contact arm ganged with contact arm A hereinafter identified by the number of the switch and the letter D, and a normally open stationary contact hereinafter identified by the number of the switch and the letter E. In Fig. 1 only one column lamp 1020 and one column stopping switch 1040 as well as one row indicating lamp 1030 and one row stopping switch 1050 are identified.

Referring now to the circuitry or wiring of the components shown in Fig. 4-E, switch arm 65' is coupled with conductor 872 from Fig. 4-D. Switch arm 61' is coupled with conductor 973 from Fig. 4-D. Switch arm 62' is coupled with conductor 975 from Fig. 4-D, switch arm 63' is coupled with conductor 979 from Fig. 4-D, switch arm 64' is coupled through a conductor 1060 with 6.3 volt supply terminal 314 and through a conductor 1061 with switch arm 75'. Switch arm 71' is coupled through a conductor 1062 with ground terminal 162 and through a conductor 1063 with terminal $i$ of receptacle 30. Switch arm 72' is coupled with conductor 844 from Fig. 4-D. Switch arm 73' is coupled with conductor 813 from Fig. 4-D. Switch arm 74' is coupled with conductor 936 from Fig. 4-D.

Solenoid 66 is coupled with conductors 842 and 881 from Fig. 4-D. Solenoid 76 is coupled with conductors 849 and 837 from Fig. 4-D.

Contact 65-A is coupled through a conductor 1064 with terminal $a$ of receptacle 30. Contact 65-B is coupled through a conductor 1065 with terminal $b$ of receptacle 30. Contact 65-C is coupled through a conductor 1066 with terminal $c$ of receptacle 30. Contact 65-D is coupled through a conductor 1067 with terminal $d$ of receptacle 30. Contacts 61-A to 61-D inclusive are respectively coupled with terminals 13 to 16 inclusive of receptacle 28 by conductors 1068, 1069, 1070 and 1071. Contact 62-A to 62-D inclusive are respectively coupled with terminals 17 to 20 inclusive of receptacle 28 by conductors 1072, 1073, 1074 and 1075. Contacts 63-A to 63-D inclusive are respectively coupled with terminals 21 to 24 inclusive of receptacle 28 by conductors 1076, 1077, 1078 and 1079.

Contacts 64-A to 64-D inclusive are respectively coupled with column indicating lamps 1020 to 1023 inclusive by conductors 1080, 1081, 1082 and 1083. Contacts 75-A, 75-B and 75-C are respectively coupled with horizontal row indicating lamps 1030, 1031 and 1032 by conductors 1084, 1085 and 1086. The other sides of lamps 1020 to 1023 inclusive and 1030 to 1032 inclusive are commoned together and connected with 6.3 volt supply terminal 316 through conductive means 1087.

Contacts 71-A, 71-B and 71-C are respectively connected with terminals $e$, $f$ and $g$ of receptacle 30 by conductors 1088, 1089 and 1090. Contacts 72-A, 72-B and 72-C are respectively coupled with conductors 941, 942 and 943 from Fig. 4-D. Contacts 73-A, 73-B and 73-C are respectively coupled with switch contacts 1050-A, 1051-A and 1052-A through conductors 1091, 1092 and 1093. Contact 74-D is coupled with contacts 78-B and 77-A through a conductor 1094.

Positive 28 volt supply terminal 210 is coupled with terminal $h$ of receptacle 30 through a conductor 1095 and with conductor 873 from Fig. 4-D.

Contact 68-A is coupled with conductor 856 from Fig. 4-D. Contact 68-B is coupled with conductor 864 from Fig. 4-D. Contact 67-A is coupled with conductor 841 from Fig. 4-D. Contact 67-B is coupled with conductor 868 from Fig. 4-D. Contact 67-C is coupled with conductor 877 from Fig. 4-D. Contact 78-A is coupled with conductor 836 from Fig. 4-D. Contact 77-B is coupled with conductor 878 from Fig. 4–D. Contact 77–C is coupled with conductor 838 from Fig. 4–D.

Contacts 1040–A, 1041–A, 1042–A and 1043–A are respectively coupled with conductors 944, 945, 946 and 947 from Fig. 4–D. Contacts 1040–B, 1041–B, 1042–B, 1043–B and contacts 1050–B, 1051–B and 1052–B are commoned together by conductors 1096 and 1097 and are coupled with conductor 854 from Fig. 4–D. Contacts 1050–E, 1051–E and 1052–E are commoned together and connected with conductor 817 from Fig. 4–D. Contact 1052–D is coupled with conductor 812 from Fig. 4–D. Contact 1052–C is coupled with contact 1051–B, contact 1051–C is coupled with contact 1050–D, and contact 1050–C is coupled through a conductor 1098 with contact 1043–C. Contact 1043–D is coupled with contact 1042–C, contact 1041–D is coupled with contact 1041–C, contact 1041–D is coupled with contact 1040–C, and contact 1040–D is coupled with conductor 833 from Fig. 4–D.

*Operation*

To operate the above-described analyzer incorporating the subject invention, the external circuits of the system to be tested are first coupled, preferably by means of an adaptor cable (not shown), between terminals 1 to 12 inclusive of receptacle 26 (Fig. 4–D) and terminals 13 to 24 inclusive of receptacle 28 (Fig. 4–E). Assuming initially that such system to be checked is comprised of 12 separate, two-terminal, external circuits, they will be respectively coupled between terminals 1 and 13, 2 and 14, etc. If the system to be checked includes one or more relays or the like to be operated when checking particular external circuits, they should be coupled between an appropriate one of terminals a, b, c and d of receptacle 30 (Fig. 4–E) and an appropriate one of terminals e, f and g, the selection of appropriate terminals being obvious from the facts that terminal a is positively energized when terminals 13, 17 and 21 are selected by switch 60, terminal b so energized when terminals 14, 18 and 22 are so selected, etc., and that terminal e is negatively energized when terminals 13, 14, 15 and 16 are selected by switch 60, etc.

Power switch 126 (Fig. 2) may then be closed to energize the power supply (Fig. 2) of the analyzer, as well as the detector unit (Fig. 4–A) and the various other operating circuits of the analyzer. At this time, test selector switch 80 (Fig. 4–B) will normally still be in its "off" position with arms 81' et seq. engaging blank contacts 81–B, 82–B, etc.

If desired, switch 328 of the ohmmeter (Fig. 3) may be set by knob 329 to select a particular resistance multiplier scale factor; switch 372 may be temporarily closed and meter 326 of the ohmmeter (Fig. 3) "zeroed" by adjustment of knob 353 to vary resistance 352; switch 474 (Fig. 4–A) may be set by knob 499 to select a predetermined tolerance valve for line resistance of a circuit under test; switch 528 (Fig. 4–A) may be set by knob 530 to select a predetermined tolerance of a circuit under test; and tap 445 of cathode biasing potentiometer 446 (Fig. 4–A) may be adjusted by knob 452 to set the sensitivity of continuity detector tube 410 to a predetermined level.

The multiple circuit selection switch 100 (Fig. 4–D) should be set by knob 109 to correspond with the circuit configuration of the system to be tested. With the configuration of 12 two-terminal circuits assumed, such setting would be with the arms 101' et. seq. in engagement with contacts 101–A, 102–A, etc. The effect of other settings of switch 100 will be treated hereinafter.

The meter selector switch 90 (Fig. 4–B) should be set by knob 99 to a position placing arms 91' et seq. in engagement with contacts 91–A, 92–A, etc. This is the position for the usual mode of automatic testing of external circuits in succession. The effect of other settings of switch 90 will be treated hereinafter.

It is noted that the normal-alternate switch 97 (Fig. 4–D) will also be set, usually to the "normal" position with arm 97' in engagement with contact 97–A. The effect of having switch 97 set in the "alternate" position will be treated hereinafter.

With such preliminary settings and adjustments accomplished, the analyzer is then ready to commence its circuit testing operations. This is done by turning test selector switch 80 (Fig. 4–B) by means of knob 89 to either the "low voltage test position" with arms 81' et seq. in engagement with contacts 81–A, 82–A, etc. or the "high voltage test position" with arms 81' et seq. in engagement with contacts 81–C, 82–C, etc. Assume that the low voltage test is chosen. The effect of instead choosing the high voltage test or the "short resistance only position" with arms 81' et seq. in engagement with contacts 81–D, 82–D, etc. will be hereinafter considered. For purposes of immediate interest, however, the effect of moving switch 80 to either of the high or low voltage test positions will be the same.

Engagement of arm 88' (Fig. 4–B) with contact 88–A (or 88–C, in the case of the high voltage test) applies the negative 24 volt power to stepping solenoid 56 (Fig. 4–D) through normally closed switch 58, normally closed relay contacts 36–F and 36–G, and normally closed switch contacts 57–A and 57–B. Energization of solenoid 56, whose other side is coupled with the positive 24 volt power through normally closed relay contacts 41–E and 41–F, opens switch 58, thereby deenergizing solenoid 56 to advance or step arms 51' et seq. one contact, in turn reclosing switch 58 upon deenergization of solenoid 56 to reenergize the latter, thereby again deenergizing solenoid 56 to advance arms 51' another step. This cycle continues until arms 51' et seq. reach their "home" or "next to start" position with arms 51' et seq. in engagement with contacts 51–E, 52–E, etc., at which the switch contacts 57–A and 57–B are opened to prevent further energization of solenoid 56, and switch contacts 57–B and 57–C are closed.

Solenoid 66 (Fig. 4–E) is similarly stepped by alternate energization and deenergization through normally closed switch 68 which opens upon energization of solenoid 66 normally closed relay contacts 36–I and 36–J, and normally closed contacts 67–A and 67–B, until arms 61' et seq. reach their "home" position in engagement with contacts 61–E, 62–E, etc., thereby opening switch contacts 67–A and 67–B to prevent further energization of solenoid 66, and closing switch contacts 67–B and 67–C.

Closure of switch contacts 57–B and 57–C energized relay coil 40, closing contacts 40–C and 40–D. Upon closure of switch contacts 67–B and 67–C, solenoid 76 (Fig. 4–E) is similarly intermittently energized and deenergized through closed switch 68, closed relay contacts 36–I and 36–J, closed switch contacts 67–B and 67–C, now closed relay contacts 40–C and 40–D, closed contacts 77–A and 77–B and normally closed switch 78 on the negative side and closed contacts 35–E and 35–F on the positive side, until switch 70 reaches its "home" position with arms 71' et seq. in engagement with contacts 71–D, 72–D, etc., thereby opening switch contacts 77–A and 77–B and closing switch contacts 77–B and 77–C.

All of stepping switches 50, 60 and 70 will now be in their "home" or next to start positions.

Closure of switch contacts 77–B and 77–C by the "homing" of stepping switch 70 energizes relay 36, which is then held energized during the remainder of the test by a holding circuit through now closed contacts 36–C and 36–D. Energization of relay 36 opens contacts 36–F and 36–G and contacts 36–I and 36–J, thereby breaking the above-mentioned "homing" circuits for solenoids 56, 66 and 76, and closes contacts 36–E and 36–F and contacts 36–H and 36–I, thereby energizing relay 39 therethrough. It may be noted that relay 39 will remain energized unless both of switches 58 and 68 are opened simultaneously by solenoids 56 and 66 being simultaneously energized.

Closure of contacts 77-B and 77-C will energize relay 37 through normally closed contacts 38-A and 38-B. Energization of relay 37 will close contacts 37-C and 37-D, thereby energizing relay 38 to open contacts 38-A and 38-B. However, relay 37, once energized, remains so by virtue of the holding circuit through its own contacts 37-G and 37-H and now closed contacts 39-G and 39-H and now closed contacts 36-A and 36-B. Thus, relay 37 will stay energized until relay 39 is deenergized.

Energization of relay 37 closes contacts 37-A and 37-B and contacts 37-E and 37-F thereof to energize solenoids 56 and 66 of switches 50 and 60, both of which are in the "home" position. It is noted that relay 34 was also energized when switch 50 was stepped to its "home" position. Accordingly, solenoid 76 is also energized by the energization of relay 37 through contacts 37-A and 37-B and contacts 34-A and 34-B. Solenoids 56, 66 and 76 are, therefore, held energized until both of switches 58 and 68 are simultaneously opened to deenergize relay 39 which will in turn deenergize relay 37.

However, the energization of solenoids 56 and 66 by the circuit just mentioned through relay contacts 37-A and 37-B and contacts 37-E and 37-F will, of course, open switches 58 and 68, thereby deenergizing relay 39 which, in turn, deenergizes relay 37. Such deenergization of relay 37 obviously deenergizes solenoids 56, 66 and 76 to step switches 50, 60 and 70 on position so that arms 51' et seq. are engaging contacts 51-A, 52-A, etc., arms 61' et seq. are engaging contacts 61-A, 62-A, etc., and arms 71' et seq. are engaging contacts 71-A, 72-A, etc. It will be observed that such positioning of switches 50, 60 and 70 corresponds to the first test position or the one pertaining to the external circuit coupled between input terminal 1 and output terminal 13. Such test position also corresponds to the uppermost and leftmost matrix square 903 of matrix chart 900 which is disposed at the coincidence of column 1000 and row 1010.

Engagement of arm 54' with contact 54-A energizes relay 43 to open the shorting contacts from such first test position. It may be noted that the engagement by arm 72' with contact 72-A energizes relay 47, thereby selecting the first bank of input terminals 1, 2, 3 and 4 and output terminals 13, 14, 15 and 16 to determine the circuit to be tested as that between terminals 1 and 13 rather than the one between terminals 5 and 16 or the one between terminals 9 and 21.

As above explained in connection with the operation of the continuity and short fault detector unit of the analyzer, the relay 42 will be deenergized only in the absence of a fault and will remain energized where either a continuity fault or a short fault is found in the external circuit coupled with any test position at which the switches 50 and 60 are then actuated. Presuming that the external circuit coupled with terminals 1 and 13 of the first test position is found by the continuity and short detector unit to be without fault, the advance relay 42 is deenergized, thereby deenergizing relay 38 to open contacts 38-A and 38-B. Opening of normally closed contacts 38-A and 38-B will result in energization of relay 37 and, therefore, energization of solenoids 56 and 66 through contacts 37-A and 37-B and 37-E and 37-F, as above described. However, since relay 34 is deenergized, solenoid 76 will not be energized. Energization of solenoids 56 and 66 opens circuit interrupter switches 58 and 68 to successively deenergize relay 39, relay 37 and solenoids 56 and 66, thereby stepping switches 50 and 60 to the next test position with their arms 51' et seq. and 61' et seq. respectively in engagement with contacts 51-B etc. and 61-B etc.

This process continues automatically from test position to test position unless a fault is found which maintains advance relay 42 energized to hold relay 38 energized, thereby preventing further stepping of switches 50 and 60. It may be noted that after switches 50 and 60 have stepped through the first four test positions and arms 51' et seq. and 61' et seq. will return to the "home" position in engagement with the contacts E of the various switch banks 51 et seq. and 61 et seq. As above described, the stepping which occurs from the "home" position steps not only switches 50 and 60 but also bank selector switch 70. Accordingly, arms 71' et seq. are moved into engagement with contacts 71-B, 71-C, etc., thereby switching banks 52 and 62 into an active roll for the testing of the external circuits coupled between terminals 5 and 17, terminals 6 and 18, terminals 7 and 19 and terminals 8 and 20. The same process is repeated in order to switch to the third banks 53 and 63 of switches 50 and 60. In the event that a fault is found in any test position, the stepping of switches 50, 60 and 70 will be automatically interrupted. After notation of the fault has been made by an operator, he operates the manual reset switch 96 to place contact 96' thereof in engagement with contact 96-B thereof. This energizes relay 37 and reinitiates the stepping of switches 50, 60 and 70 in the manner above explained.

In the event that it is desired to reset from any test position to another particular test position not immediately following the one at which stepping switches 50, 60 and 70 are then disposed, the operator may manually operate any one of the switches 1040, 1041, 1042 and 1043 and any one of the switches 1050, 1051 and 1052. When this is done, relays 37 and 38 act as a relay multivibrator circuit to permit advancement of the switches 50, 60 and 70 simultaneously until arm 73' engages the contact of switch bank 73 corresponding with the one of switches 1050, 1051 and 1052 which is held operated, thereby energizing relay 35 to open the positive voltage supply to solenoid 76 to stop the advancement of the latter. Similarly, bank 55 of switch 50 will advance until the arm 55' thereof is in engagement with that contact corresponding to the particular one of switches 1040, 1041, 1042 and 1043 which has been operated, thereby energizing relay 41 to open the positive side of the voltage supply to solenoids 56 and 66 and stop the advancement of the latter. Relays 35 and 41 will remain energized until their circuit is broken by actuation of the reset switch 96.

It may be significantly observed that the function of relay 39 is to assure that the external circuits connected to banks 51, 52 and 53 of switch 50 and the circuits to relays 43 to 46 inclusive and to relay 34 are disconnected before the stepping switches 50 and 60 advance. This prevents the destructive arcing or burning of the wiper arms of such stepping switches and the contacts of such relays. Such objective is accomplished since the relay 39 cannot be deenergized until both of solenoids 56 and 66 have become fully energized to open their corresponding circuit interrupter switches 58 and 68, and since switches 50 and 60 are so constructed that advancement of the arms 51' et seq. and 61' et seq. occurs upon deenergization of the corresponding solenoids 56 and 66.

As will be obvious, the vertical column indicating lights 1020, 1021, 1022 and 1023 associated with matrix chart 900, are coupled with switch banks 64, while the row indicating lamps 1030, 1031 and 1032 are coupled with switch bank 75, so that such indicating lamps always indicate the particular matrix square 903 corresponding with the external circuit under test as determined by the positioning of stepping switches 50, 60 and 70.

If the test selector switch 80 is set to the high voltage test position rather than the low voltage test position, the operation will be substantially the same insofar as sequencing of external circuits under test is concerned, but will tend to render the fault detector unit more accurately sensitive with respect to insulation resistance, whereas with switch 80 in the low voltage test position the detector unit is operating in the optimum condition for detection of faults in line resistance. The short resistance only position with arms 81' et seq. in engagement with contacts 81–D etc. is used only under special conditions that need not here be detailed for the precise measurement of insulation resistance.

Similarly, when meter selection switch 90 is positioned with its arms 91' et seq. in engagement with contacts 91–A, etc., the normal or automatic testing above described is accomplished. What may be referred to as position B of switch 90, where arms 91' et seq. are in engagement with contacts 91–B, etc., is used for employing the ohmmeter of the analyzer to read the line resistance upon a faulty external circuit corresponding with banks 51 and 61 of switches 50 and 60 and for all multiple circuits (see discussion hereinafter) wherever located. Position C of switch 90 is used for employing the ohmmeter to measure line resistance for all single circuits coupled between terminals 5 to 12 inclusive and 17 to 24 inclusive, respectively. Position D of switch 90 is used to measure the insulation resistance of a faulty external circuit, regardless of the terminals of receptacles 26 and 28 at which such circuit is coupled.

The normal-alternate switch 97 permits reversal of the output connection of an external circuit coupled with terminals 13, 14, 15 or 16 as if same were coupled with terminals 17, 18, 19 and 20 respectively instead, such reversal being accomplished by movement of switch arm 97 into engagement with contact 97–B. Such reversal is desirable in testing some types of external circuitry having multiple output terminations such that the circuit perimeters from input terminal 1 to output terminal 17 should be checked, as well as the normal checking of the external circuit perimeters between input terminal 1 and output terminal 13. In effect, the move of switch 97 to its alternate position switches the output terminations coupled with output terminals 13, 14, 15 and 16 to terminals 17, 18 and 19 and vice versa.

Reference is now made to the important contribution to the art made by the analyzer of this invention in providing for the testing of so-called multiple circuits which have a single or common input termination and a number of separate output terminations. Even with the multiple circuit selection switch 100 in its normal position with arms 101' et seq. engaging contacts 101–A, 102–A, etc., circuits having a single input termination and up to three (in the simplified embodiment illustrated) output terminations may be tested. For instance, the input connection could be coupled with input terminal 1 and the three output terminations respectively coupled with output terminals 13, 17 and 21. With this arrangement, that portion of the circuit connected between input terminal 7 and output terminal 13 is checked when switches 50, 60 and 70 are in their first test position, that portion of the circuit between input terminal 1 and output terminal 17 is checked when switches 50, 60 and 70 are in their test positions corresponding to terminals 5 and 17 by virtue of the fact that the test voltage circuit to input terminal 1 through the bank selector relay contacts 48–E and 48–F. The remaining four positions on the multiple circuit selector switch 100 are used where an external circuit to be tested has a single input termination and more than three output terminations (with commercial embodiments the number of output terminations which can be handled is obviously increased). With switch 100 in its position B input terminals 1 and 2 are shorted together. In position C input terminals 1 and 2 are shorted together and input terminals 3 and 4 are shorted together. In position D input terminals 1, 2 and 3 are shorted together. In position E all four of the terminals 1, 2, 3 and 4 corresponding with bank 51 of switch 50 are shorted together. To illustrate the use of these various test positions, assume that an external circuit to be tested has a single input and six separate outputs. The input termination would be connected with input terminal 1, the output terminations would be connected with output terminals 13, 14, 17, 18, 21 and 22, and switch 100 would be operated to place arms 101' et seq. in engagement with contacts 101–B, 102–B, etc. This will permit the testing of all portions of the multiple circuit in the manner which will be apparent from the above discussion. With a multiple circuit having one input termination and twelve output terminations, the input termination would be coupled with input terminal 1 and the output terminations with output terminals 13 to 24 inclusive and switch 100 would be placed in its multiple circuit test position E.

It will now be apparent that the analyzer of this invention accomplishes many useful and advantageous operations not possible with previously known types of circuit testers and that all of such objectives may be accomplished automatically with a minimum of manipulation of controls or other attention by an operator. Manifestly, many minor modifications and changes could be made from the exact structure shown for purposes of illustration without departing from the true spirit and principles of the invention. Accordingly, it is to be understood that the invention shall be deemed limited only by the scope of the appended claims.

Having thus described the invention, what is claimed as new and desired to be secured by Letters Patent is:

1. In a circuit analyzer for testing a plurality of external electrical circuits: input terminal means for each of said plurality of external circuits respectively and adapted for coupling with at least one termination of the latter; output terminal means for each of said plurality of external circuits respectively and adapted for coupling with at least another termination of the latter; first circuit fault detecting means adapted for coupling with a source of electrical power and including electrically responsive fault indicating means; first switching means for coupling said input terminal means and said output terminal means for any one of said plurality of external circuits with said first circuit fault detecting means; actuating means for said first switching means and operably coupled therewith for actuating said first switching means to automatically and successively couple said input terminal means and said output terminal means for each of said plurality of external circuits with said first circuit fault detecting means; second circuit fault detecting means adapted for coupling with a source of electrical power and including electrically responsive fault indicating means; second switching means for coupling said input terminal means for any one of said plurality of external circuits and one of said terminal means for at least another of said plurality of external circuits with said second circuit fault detecting means; actuating means for said second switching means and operably coupled therewith for actuating said second switching means to automatically and successively couple said input terminal means for each of said plurality of external circuits and one of said terminal means for at least another of said plurality of external circuits with said second circuit fault detecting means; and operating means for operating said actuating means for said first and second switching means in a controlled, predetermined, cooperative relationship with each other.

2. In a circuit analyzer as set forth in claim 1, wherein is provided control means operably coupled with both of said circuit fault detecting means and both of said actuating means for interrupting operation of the latter whenever a fault is detected by either of said circuit fault detecting means.

3. In a circuit analyzer as set forth in claim 2 wherein each of said switching means includes a stepping switch, each of said actuating means includes an electrically responsive device for the corresponding stepping switch operably coupled with the latter for advancing the same, each of said circuit fault detecting means includes a relay having a coil and a relay switch operable upon energization of the coil, each of said coils is coupled with the corresponding of said circuit fault detecting means, and said control means has said relay switches coupled therewith.

4. In a circuit analyzer as set forth in claim 1, wherein said first switching means includes a first stepping switch having a movable contact and a number of stationary contacts adapted to be engaged by the movable contact, said stationary contacts being respectively coupled with said input terminal means, and a second stepping switch having a movable contact and a number of stationary contacts adapted to be engaged by the last mentioned movable contact, said last mentioned stationary contacts being respectively coupled with said output terminal means.

5. In a circuit analyzer as set forth in claim 4, wherein is provided means in addition to the parts of said stepping switches themselves for visually indicating the positions of said stepping switches, whereby the identity of the external circuit under test at any moment can be readily determined.

6. In a circuit analyzer as set forth in claim 1, wherein said first circuit fault detecting means includes means for detecting as a fault a condition of eletcrical resistance greater than a predetermined value in an external circuit coupled therewith, and said second circuit fault detecting means includes means for detecting as a fault a condition of electrical resistance less than a predetermined level between an external circuit and a termination of at least one other external circuit coupled therewith.

7. In a circuit analyzer as set forth in claim 1, wherein said operating means is operably coupled with both of said actuating means and includes means for operating the latter substantially simultaneously and in synchronism for maintaining the input terminal means for the particular external circuit that is at any time coupled with said first circuit fault detecting means also coupled simultaneously with said second circuit fault detecting means.

8. In a circuit analyzer as set forth in claim 1, wherein said second switching means couples said input terminals for any one of said plurality of external circuits with said second circuit fault detecting means and simultaneously couples together with each other and with said second circuit fault detecting means one of said terminal means for all of the remaining ones of said plurality of external circuits.

9. In a circuit analyzer as set forth in claim 1, wherein is provided a plurality of structures for visually indicating the identity of the particular one of said plurality of external circuits that is at any time coupled with said first circuit fault detecting means.

10. In a circuit analyzer as set forth in claim 9, wherein said structures comprise a plurality of indicating lights arranged in a pair of perpendicular rows defining a matrix of which each intersection corresponds to one of said plurality of external circuits, the lights within each row being operable alternately, one light of each row being operable simultaneously to indicate the matrix intersection corresponding to the particular one of said plurality of external circuits then coupled with said first circuit fault detecting means.

11. In a circuit analyzer as set forth in claim 10, wherein is provided means for mounting a matrix chart carrying indicia identifying each of said plurality of external circuits in proximity to said rows of lights and so positioned that its intersections correspond with the intersections of the matrix defined by said lights.

12. In a circuit analyzer for testing a plurality of external electrical circuits including some having an input termination and a plurality of output terminations: input terminal means for each of said plurality of external circuits respectively and adapted for coupling with the input termination of the latter; output terminal means for each output termination respectively of each of said plurality of external circuits respectively and adapted for coupling with the same; first circuit fault detection means adapted for coupling with a source of electrical power, responsive to a condition of electrical resistance greater than a predetermined value in an external circuit coupled therewith, and including means for indicating as a fault the occurrence of said condition; first switching means including first mechanism for coupling any of said input terminal means with said first circuit fault detection means, and second mechanism for coupling any of said output terminal means with said first circuit fault detection means; actuating means for said first and second mechanisms and operably coupled therewith for actuating said mechanisms to automatically and in predetermined order couple each of said input terminal means and each of said output terminal means with said first circuit fault detecting means; second circuit fault detecting means adapted for coupling with a source of electrical power, responsive to a condition of electrical resistance less than a predetermined level between a pair of external circuit terminations coupled therewith and including means for indicating as a fault the occurrence of said last-mentioned conditions; second switching means for coupling said input terminal means for any one of said plurality of external circuits and said output terminal means for only all other of said plurality of external circuits with said second circuit fault detecting means; actuating means for said second switching means and operably coupled therewith for actuating said second switching means to automatically and in predetermined order couple said input terminal means of each of said plurality of external circuits and all the output terminal means of only all other of said plurality of external circuits with said second circuit fault detecting means; and operating means for operating said actuating means for said first and second mechanisms and said second switching means in a controlled, predetermined, cooperative relationship with each other.

13. In a circuit analyzer as set forth in claim 12, wherein is provided control means operably coupled with both of said circuit fault detecting means and both of said actuating means for interrupting operation of the latter whenever a fault is detected by either of said circuit fault detecting means.

References Cited in the file of this patent

UNITED STATES PATENTS

| | | |
|---|---|---|
| 1,089,814 | Beach | Mar. 10, 1914 |
| 2,329,491 | Sulzer | Sept. 14, 1943 |
| 2,376,232 | Cummings | May 15, 1945 |
| 2,576,892 | Stanton | Nov. 27, 1951 |
| 2,581,497 | Podell | Jan. 8, 1952 |
| 2,584,680 | Doncyson | Feb. 5, 1952 |
| 2,586,125 | Van Blarcom | Feb. 19, 1952 |
| 2,614,152 | Herborn | Oct. 14, 1952 |
| 2,622,130 | Kabell | Dec. 16, 1952 |
| 2,762,014 | Anderson | Sept. 4, 1956 |